US011250857B1

(12) United States Patent
Kim et al.

(10) Patent No.: US 11,250,857 B1
(45) Date of Patent: Feb. 15, 2022

(54) POLLING WITH A NATURAL LANGUAGE INTERFACE

(71) Applicant: Amazon Technologies, Inc., Seattle, WA (US)

(72) Inventors: Eric Sungmin Kim, Chino Hills, CA (US); Greg Roberts, La Jolla, CA (US); Daniel Zi Wang, Irvine, CA (US); Dylan Robert House, Corona, CA (US); Luis Valencia, San Pedro, CA (US); Paul Damian Tidwell, Seattle, WA (US); John Benjamin Dalin, Edmonds, WA (US); Steven T. Rabuchin, Kirkland, WA (US); James Robert Blair, Seattle, WA (US); Vicky Ge, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 362 days.

(21) Appl. No.: 16/453,062

(22) Filed: Jun. 26, 2019

(51) Int. Cl.
*G10L 15/26* (2006.01)
*G06F 3/16* (2006.01)
*G10L 15/18* (2013.01)

(52) U.S. Cl.
CPC .............. *G10L 15/26* (2013.01); *G06F 3/167* (2013.01); *G10L 15/1822* (2013.01)

(58) Field of Classification Search
None
See application file for complete search history.

(56) References Cited

U.S. PATENT DOCUMENTS

| 7,237,717 | B1 * | 7/2007 | Rao ..................... | H04B 1/0057 |
| | | | | 235/386 |
| 2002/0106620 | A1 * | 8/2002 | Barnum ................ | G07C 13/00 |
| | | | | 434/306 |
| 2010/0241493 | A1 * | 9/2010 | Onischuk ............ | G06F 21/6245 |
| | | | | 705/12 |
| 2012/0096073 | A1 * | 4/2012 | Elwood ................ | G06F 16/957 |
| | | | | 709/203 |
| 2013/0238974 | A1 * | 9/2013 | Beltramo, Jr. ......... | G06Q 30/02 |
| | | | | 715/234 |
| 2014/0351257 | A1 * | 11/2014 | Zuzik .................. | G06F 16/9535 |
| | | | | 707/740 |
| 2015/0358217 | A1 * | 12/2015 | Wang .................... | H04L 43/04 |
| | | | | 709/203 |
| 2018/0197019 | A1 * | 7/2018 | Ekambaram .......... | H04R 27/00 |
| 2019/0174193 | A1 * | 6/2019 | Wirasinghe ........ | H04N 21/4524 |
| 2019/0213611 | A1 * | 7/2019 | Duhigg .............. | G06Q 30/0203 |
| 2019/0279241 | A1 * | 9/2019 | DiTomaso ............ | H04L 9/3239 |

* cited by examiner

*Primary Examiner* — Neeraj Sharma
(74) *Attorney, Agent, or Firm* — Pierce Atwood LLP

(57) ABSTRACT

Exemplary embodiments relate to using a voice user interface for creating a poll to send to users. A poll requestor can create a poll using voice instructions and specify response options and setup information. After creating the poll, the system broadcasts it to users who can respond to the poll. The poll may be broadcasted while a user is receiving content. The users can respond using a voice user interface. The system compiles the responses and provides them to the poll requestor.

20 Claims, 16 Drawing Sheets

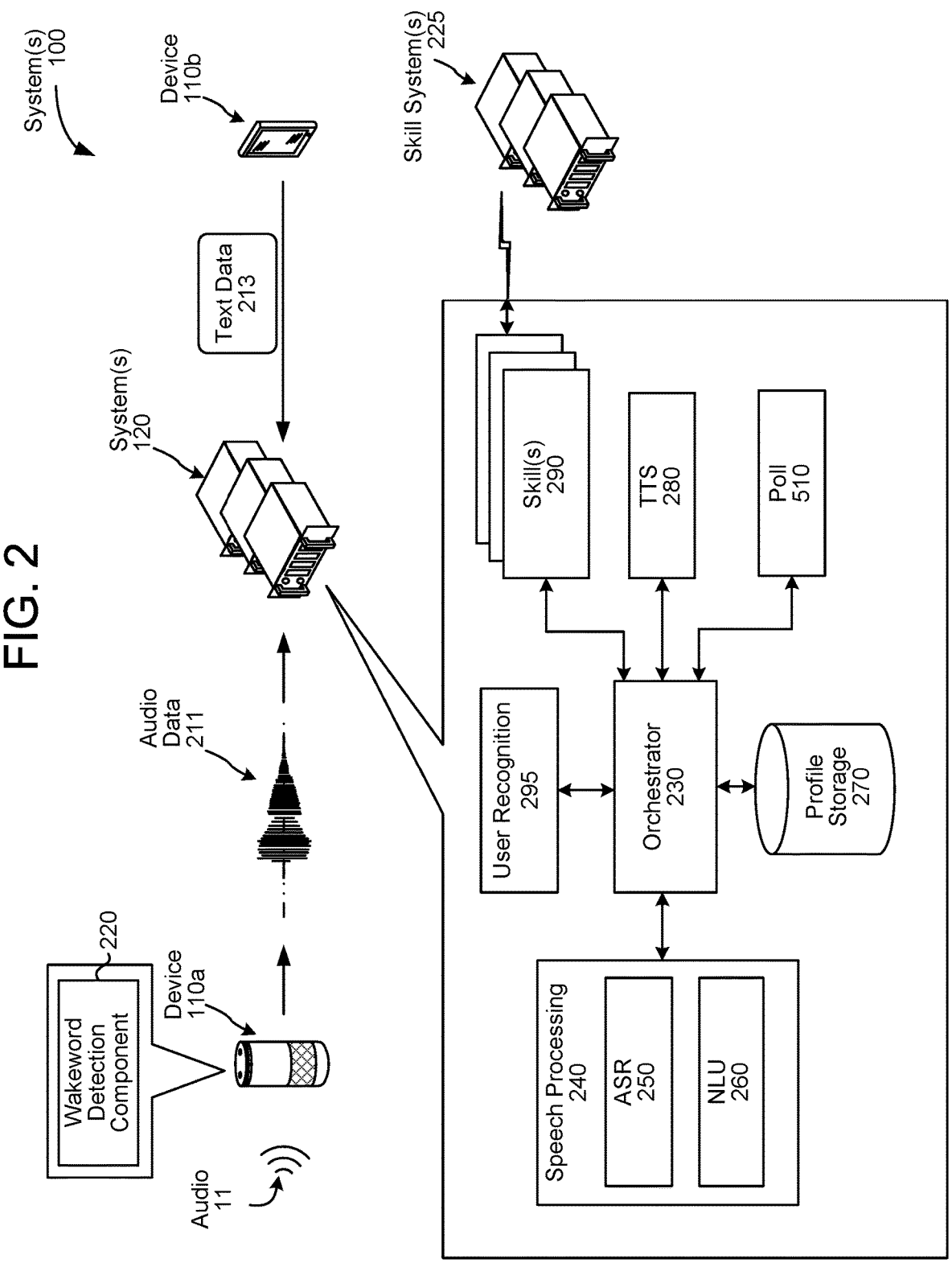

POLLING WITH A NATURAL LANGUAGE INTERFACE

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 2 is a conceptual diagram of speech processing components of a system according to embodiments of the present disclosure.

DETAILED DESCRIPTION

Figure 1A:
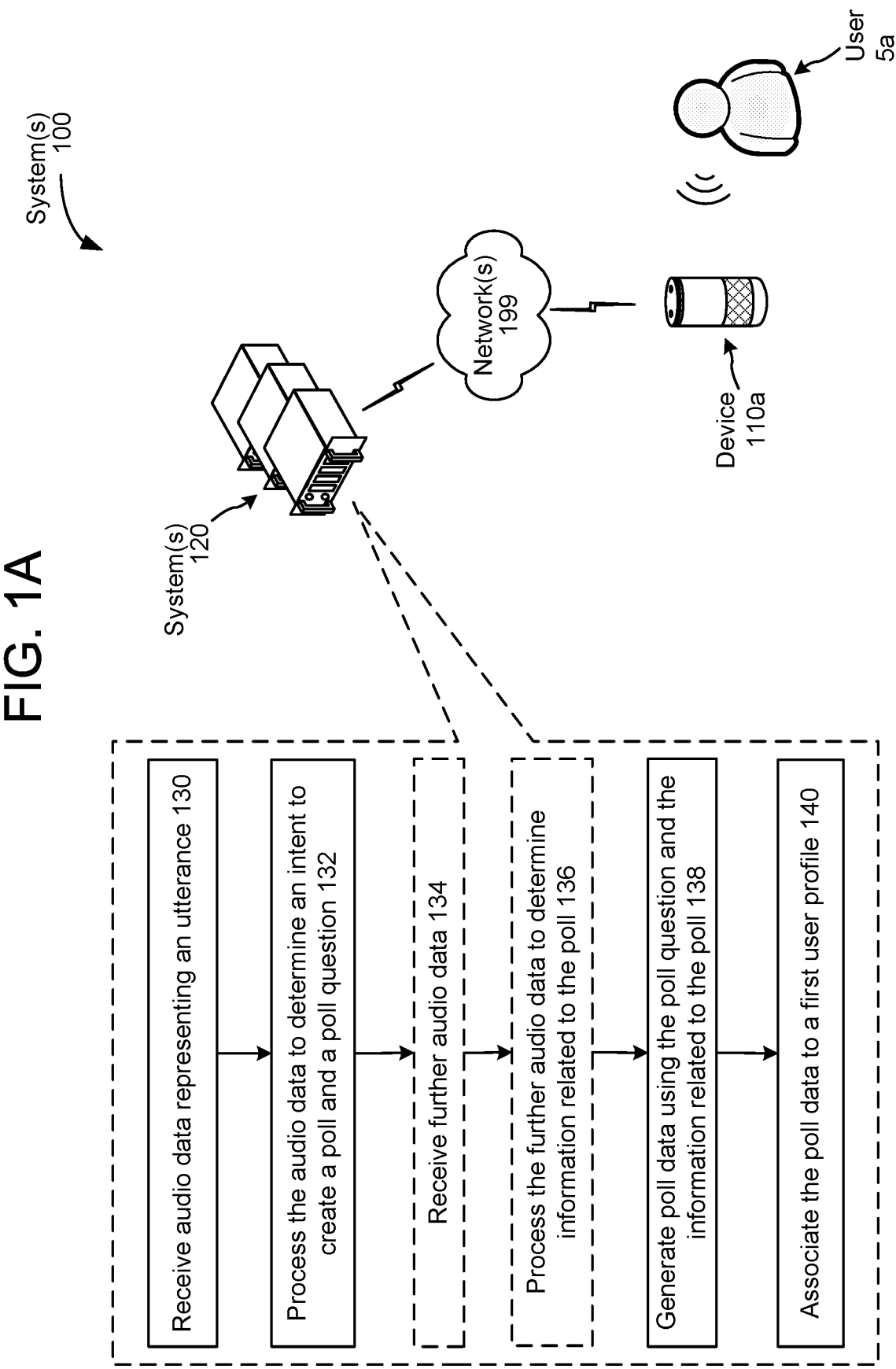
FIG. 1A illustrates a system configured to create a poll according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, though in certain systems speech processing may include only one of ASR or NLU (or another speech processing technique).

A distributed computing environment may be used to when performing speech processing. An example of such a distributed environment may involve a local client device (e.g., a device in the same environment as a user and capable of capturing spoken commands from the user) having one or more microphones being configured to capture sounds from a user speaking (e.g., "utterances") and convert those sounds into data (e.g., "an audio signal"). The audio signal/data may then be sent to a downstream remote device for further processing, such as converting the audio signal into an ultimate command. The command may then be executed by a combination of remote and local devices depending on the command itsel.

In certain situations, users may receive content like podcasts, videos, radio or other audio/video content, using a voice controlled device. The content can include interactive portions where users can provide speech feedback or input to the device. For example, producers of the content can include polls as interactive portions of the content and the listening users can provide their answers to the polls by speaking to the device. Users may also provide their responses in a text or other non-voice format (e.g., selecting an option displayed on a screen). For users currently receiving content on one device, the system may determine that that particular device is currently occupied, and so therefore may send the poll to another device associated with that user's profile, so as not to disturb the device that is currently receiving content. A poll may include one or more questions with each question having at least two response options to choose from. In some cases, a poll may include one or more questions with open-ended answer option (versus response options to choose from).

In other situations, users can request that a system create a poll using a voice controlled device by speaking instructions to create the poll. Alternatively the users can request the system create a poll through a text-based input or other non-voice input. The poll requestor can specify how and when the poll is pushed to other users. For example, the requestor can specify a time window for receiving answers, what geographic area the answers should be received from, particular content the poll should be published with, and the like. A poll requestor may say "Alexa create a poll to ask users what is the make of their car?" or "Alexa I want to create a poll to ask [number of] users in [city name] what food do they like better, [food option A] or [food option B]?"

Offered is a system that enables users to create a poll using a natural language interface which may include a voice interface and/or a text interface. The system may process the instructions to create the poll, and may associate any instructions on how and when the poll is to be published. The system may also enable users to respond to the poll via a voice interface, and may process answers from multiple users and provides the results to the user who created the poll.

The poll can be published during playback of content that is pre-recorded or live. For example, a podcaster may create a poll that is played to the audience during a live podcast. The voice controlled device can output audio data representing the poll and activate a microphone of the device or enter listening mode to enable the audience to respond to the poll. The audience members can then speak (and/or text/select a responsive button for) their respective answers to the poll to their devices, the system can process the answers using ASR, NLU, and/or other techniques, tally the answers from the users who responded, and send the results to the podcaster. Then the podcaster can provide the results to the poll to the audience during the live podcast. In this manner, the system enables a content producer to engage with an audience and provide an interactive experience.

The system can process answers from users and compare them to the response options provided by the poll requestor. If the poll allows for open answers, rather than choosing an option, the system can process the answers and determine a theme in the responses.

The system described herein may also be used in a game show setting, such as a trivia based game show. A user wanting to create a game can provide instructions (voice-based or non-voice based) specifying the questions in the game, the correct answer to the questions, the users that can play the game, the amount of time a user has to answer a question, when the game starts and ends, and the like. The system may process the instructions to create the game and publish the game to users in accordance with the instructions. A user playing the game can provide his or her answers (voice-based or non-voice based) to the system, and may receive an indication whether the answer was correct.

A system implementing the present disclosure may require user permission to perform the teachings herein. For example, the system may require a user to opt in, with informed consent, prior to pushing polls to the user to answer. The system may provide the teachings of the present disclosure via a poll skill or application that the poll requestor and the poll answering user may have to install or grant permission to for the system to implement the present disclosure. For example, the user may have to install the application or skill to enable the system to activate the microphone of the user's device, without the user speaking a wakeword, to receive/capture an answer to the poll. The system may include privacy and notification settings that the user can control to choose how user data is processed, to delete user data, how often the user is notified of or pushed polls, and the like. The system may store the answers provided by the users in an anonymous manner, for example without associating data with the answer that identifies the answering user. In other cases, the system may store data identifying some characteristics of the answering user as required by the poll, for example a geographic location, and/or other demographic data corresponding to the answering user.

Figure 1B:
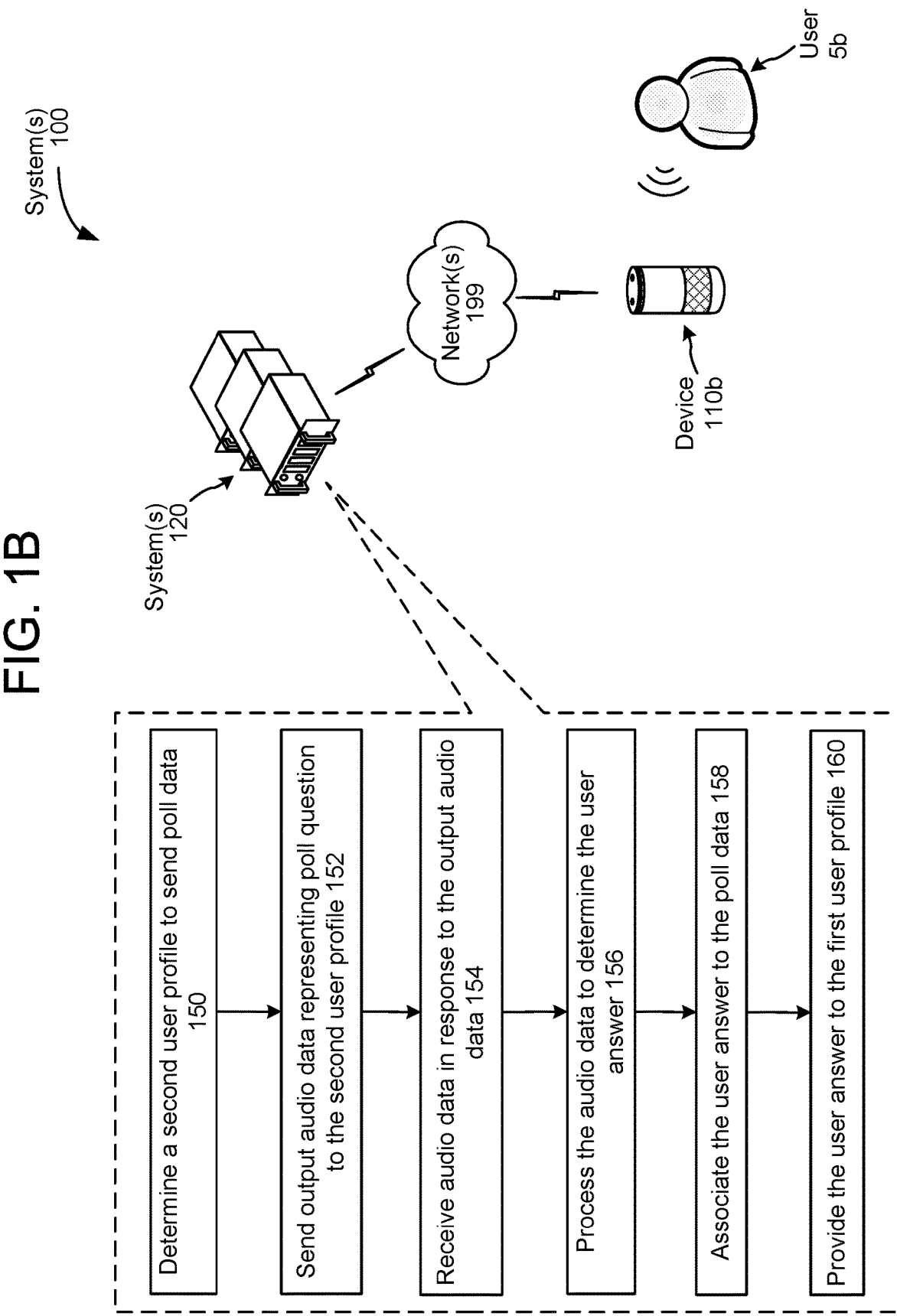
FIG. 1B illustrates a system configured to receive answers to a poll according to embodiments of the present disclosure.

FIG. 1A illustrates a system 100 configured create a poll according to embodiments of the present disclosure. FIG. 1B illustrates a system 100 configured to receive answers to a poll according to embodiments of the present disclosure. Although the figures and discussion illustrate certain operational steps of the system in a particular order, the steps described may be performed in a different order (as well as certain steps removed or added) without departing from the intent of the disclosure. As illustrated in FIGS. 1A and 1B, the system may include a device 110 local to a user 5, and one or more systems 120 connected across one or more networks 199. The system(s) 120 (which may be one or more different physical devices) may be capable of performing traditional speech processing (such as ASR, NLU, etc.) as described herein. A single system may be capable of performing all speech processing or multiple systems 120 may combine to perform the speech processing. Further, the system(s) 120 may be configured to execute certain commands, such as answering queries spoken by user 5. In addition, certain speech detection or command execution functions may be performed by device 110. While the present disclosure relates to creating polls and receiving responses to polls, it should be understood that polls is intended to include other terms such as surveys, questions relating to opinions, and/or other instances where the system may ask a question to multiple users.

The system(s) 120 receives (130) audio data representing an utterance. The utterance may be spoken by user 5a, captured by device 110a, and sent to the system(s) 120. The user 5a may want to create a poll, and may be referred to herein as a poll requestor. The utterance may be "Alexa, create a poll to ask users what food item they like better: pizza or burger." In some embodiments, the system(s) 120 may receive text-based input or other non-voice input representing instructions to create a poll. The system(s) 120 processes (132) the audio data to determine an intent to create a poll, and a poll question. The system(s) 120 may process the audio data using ASR, as described below, to determine input text data representing the utterance. The system(s) 120 may then process the input text data using NLU, as described below, to determine the user's 5a intent to create a poll. The system(s) 120 may also determine the poll question from the text data, for example, "what food item do you like?" In some cases, the utterance from user 5a may also include response options for the poll. The system(s) 120 may determine the response options from the input text data, for example, "pizza" and "burger." The system(s) 120 may store question text data representing the poll question determined from the input text data. The system(s) 120 may also store first response text data and second response text data representing the response options determined from the input text data.

The system(s) 120 may also receive (134) further audio data 134 representing another utterance from the user 5a. The system(s) 120 processes (136) the further audio data to determine setup information related to the poll. In some embodiments, the system(s) 120 may receive text-based input or other non-voice input representing setup information for the poll. In some embodiments, the setup information for the poll may be included in the audio data received in operation 130. The system(s) 120 may process the further audio data using ASR to determine text data representing the utterance. The system(s) 120 may process the text data using NLU to determine setup information corresponding to the poll. The setup information may include a time window for when the user 5a wants the poll to be active. The setup information may also include a number of users that user 5a want to poll, or a number of responses that user 5a wants to the poll. The setup information may further include a geographic area whose users the user 5a wants to poll. The setup information may also specify if the user 5a wants the poll to be outputted during broadcast of particular content or while a user is streaming particular content. The system(s) 120 may store the setup information related to the poll. Although noted as determining the above information from the further audio data, it may also be determined using just the initial utterance and respective audio data.

The system(s) generates (138) poll data using the poll question and the setup information determined from the audio data received from the user 5a. The system(s) 120 may store the question text data and the setup information in a poll data table (e.g., poll data storage 525) to facilitate sending polls to users. The system(s) 120 associates (140) the poll data with a first user profile associated with the user 5a/poll requestor.

During a time period after (or partially in parallel with) the poll is created per operations 130-140, the system(s) 120 determines (150) a second user profile (to identify users) to send poll data. The system(s) 120 may determine a second user profile corresponding to a potential respondent of the poll based on the setup information provided by the poll requestor. For example, the second user profile may be active during the time window that the poll is open. The second user profile may be associated with a location within the geographic area associated with the poll data. The second user profile may not have answered the poll already. The second user profile may be receiving the content specified by the poll requestor.

In some embodiments, the system(s) 120 may identify potential respondents for the poll based on the user opting-in or subscribing to answer polls, for example that relate to particular topics. In some embodiments, the system(s) 120 may also identify users to answer the poll based on the user previously answering polls that relate to particular topics. In further embodiments, the system(s) 120 may also identify users to answer the poll using the user's interests, hobbies, past interactions with the systems, and the like, to determine how likely it is the user will answer the poll or how likely the user would be interested in answering the poll.

The system(s) 120 may identify suitable users to provide answers to the poll based on the poll topic, and the user's participation in answering polls previously in that topic, and the user's participation in answering polls overall. Each user/potential answerer may be assigned a score in each topic for which they have answered polls in the past based on the frequency of them answering polls in the topic. The score for each topic may also be determined based on the user's interests/hobbies determined from the user's interactions with the system, such as content received/viewed by the user, purchase history, usage of applications/skills, and the like.

The system(s) 120 may also determine a topic for which the user has an affinity. The system(s) 120 may maintain a record of the user's system usage (in profile storage 270). The system(s) 120 may process the user's system usage history to determine one or more topics the user's input relates to. For example, the user's system usage history may represent the user routinely asks the system questions about food. The system(s) 120 may determine a user has an affinity for a topic that the user has asked the system questions about at least a threshold number of times. The system(s) 120 may perform this processing after it receives an indication that the user wants to answer one or more polls. Alternatively, the system(s) 120 may perform this processing periodically (e.g., once a week, once a month, etc.). By performing such processing periodically, the system may be able to decrease a time between when the user indicates he or she wants to answer at least one poll and a time when at least one poll is output to the user.

In some embodiments, the user may initiate an interaction with the system to answer a poll. A user 5b may interact with the device 110b to indicate an interest to answer at least one poll. For example, the user may say "Alexa, tell me a poll question you want answered." Alternatively, the user may provide such an indication by interacting with the poll functionality presented in a companion application implemented on their device 110. The system(s) 120 may perform user recognition processing with respect to the user's speech to determine a user profile ID associated with the user that originated the speech. Alternatively, the server(s) 120 may determine a user profile ID associated with a device ID associated with the device 110 that originated the indication that the user wants to answer one or more questions. The system(s) 120 may determine one or more polls to send to the user 5b based on the user's geographic location, the user being subscribed to one or more polls that he has yet to answer, the user being subscribed to answer polls related to a particular topic, the user's interests, and the like.

The system(s) 120 sends (152) output audio data representing the poll question to the second user profile for output. The output audio data may be generated by processing the question text data using text-to-speech (TTS) techniques, as described below. The output audio data may also include response options, if available, for the user to choose from. In other embodiments, the system(s) 120 may send text data corresponding to the poll question to a device 110 for output via a display. The output may also include visual prompts, such as buttons, that the user can select to answer the poll or a text field the user can input an answer in. For example, the buttons may correspond to the response options for the poll if any are available.

The system(s) 120 receives (154) audio data in response to the output audio data from the second user profile. The second user profile may be associated with user 5b who may provide an answer to the poll. The user 5b may speak the answer, the device 110b may capture the audio data representing the answer, and the device 110b may send the audio data to the system(s) 120. In an example embodiment, the system(s) 120 may cause the device 110b to enter listening mode and/or activate a microphone (without the user 5b having to say the wakeword) to enable the device 110b to capture the answer spoken by the user 5b. The device 110b may activate its microphone after the output audio data representing the poll question is outputted by the device 110b. In some embodiments, the system(s) 120 may receive text-based input or other non-voice based input in response to the output audio data/poll question.

The system(s) 120 processes (156) the audio data from the second user profile to determine the user answer to the poll. The system(s) 120 may process the audio data using ASR to determine answer text data representing the user answer. In the case where the poll data includes response options, the system(s) 120 may determine that the answer text data corresponds to one of the response options (e.g., first response text data) corresponding to the poll data. The system(s) 120 associates (158) the answer to the poll data. For example, the system(s) 120 may generate poll response data indicating selection of one of the response options. Upon receiving answers from multiple users, the system(s) 120 may determine an answer tally representing a number of users that selected each response option corresponding to the poll data. In the case where the response to the poll is open-ended or freeform, the system(s) 120 may process the answers receiving from multiple users to determine a theme associated with the answers. The system(s) 120 may determine a top answer by determining an answer provided by the most number of users. In some embodiments, the poll response data may include data identifying the answering user (e.g., user 5*b*), such as demographic information (e.g., location, gender, age group, education level, occupation, etc.) corresponding to the user that may be required by the poll. According to user preferences and privacy settings, the poll response data may not include certain user identification data such as user name, user profile ID, and the like.

The system(s) 120 provides (160) the user answer to the first user profile associated with the user 5*a*/poll requestor. The system(s) 120 may send the poll response data or the answer tally to the first user profile. In other cases, the system(s) 120 may send one or more themes corresponding to the answers. The system(s) 120 may generate a report representing the poll answers received from users, where the report may include a summary or aggregation of the poll answers. In other embodiments, the system(s) 120 may send a notification to the first user profile after a poll answer is received by the system. The system(s) 120 may send the notification to the first user profile after each poll answer is received, after a number of poll answers are received, or after the poll has closed/ended. The poll requestor (e.g., user 5*a*) may access/view the poll answers, report and/or poll response data determined by the system(s) 120. The system(s) 120 may present the poll answers to the poll requestor in a graphical form, for example, using graphs, charts, icons, emoji, and the like.

In an example embodiment, the system(s) 120 may determine that the second user profile is receiving content that includes an interactive portion. The system(s) 120 may send the output audio data representing the question text data to the second user profile for output during the interactive portion of the content.

The overall system 100 of the present disclosure may operate using various components as illustrated in FIG. 2. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection may be performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. The speech processing component may include an ASR component 250 and an NLU component 260. The ASR component 250 converts spoken utterances into text, if not already converted into text when received from the device 110. The text is processed by the NLU component 260, which may determine the semantic meaning of the text.

For example, the ASR component 250 of the speech processing component 240 transcribes the input audio data 211 into input text data representing one more hypotheses representing speech contained in the input audio data 211. The text data output by the ASR component 250 may thus represent one or more (e.g., in the form of an N-best list)

ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110b may receive a text-based user input. The device 110b may generate text data 213 representing the text-based user input. The device 110a may send the text data 213 to the natural language processing system 120. The orchestrator component 230 may receive the text data 213. The orchestrator component 230 may send text data (e.g., text data output by the ASR component 250 or the received text data 213) to an NLU component 260.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 2330 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis, for example unit selection, the TTS component 280 matches text data against a database of recorded speech. The TTS component 280 selects matching units of recorded speech and concatenates the units together to form audio data. In another method of synthesis, for example parametric synthesis, the TTS component 280 varies parameters such as frequency, volume, and noise to create audio data including an artificial speech waveform. Parametric synthesis uses a computerized voice generator, for example a vocoder.

The system(s) 120 may include a user recognition component 295. In at least some examples, the user recognition component 295 may be implemented as a skill 290, or as part of a skill system 125.

The user recognition component 295 may recognize one or more users using a variety of data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the system(s) 120 in correlation with a user input, to stored biometric data of users. The user recognition component 295 may additionally or alternatively perform user recognition by comparing image data (e.g., including a representation of at least a feature of a user), received by the system(s) 120 in correlation with a user input, with stored image data including representations of features of different users. The user recognition component 295 may perform other or additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the user input. Alternatively, the user recognition component 295 may output multiple user identifiers (e.g., in the form of an N-best list) with respective values representing likelihoods of respective users originating the user input. The output of the user recognition component 295 may be used to inform NLU processing, processing performed by a skill 290 or skill system 125, as well as processing performed by other components of the natural language processing system(s) 120 and/or other systems.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may also include a poll component 510 to facilitate creation of polls and sending of polls to users to receive answers. Further details of the poll component 510 are described in relation to FIGS. 5 and 6.

The system may be configured to incorporate user permissions and may only perform activities disclosed herein if approved by a user. As such, the systems, devices, components, and techniques described herein would be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
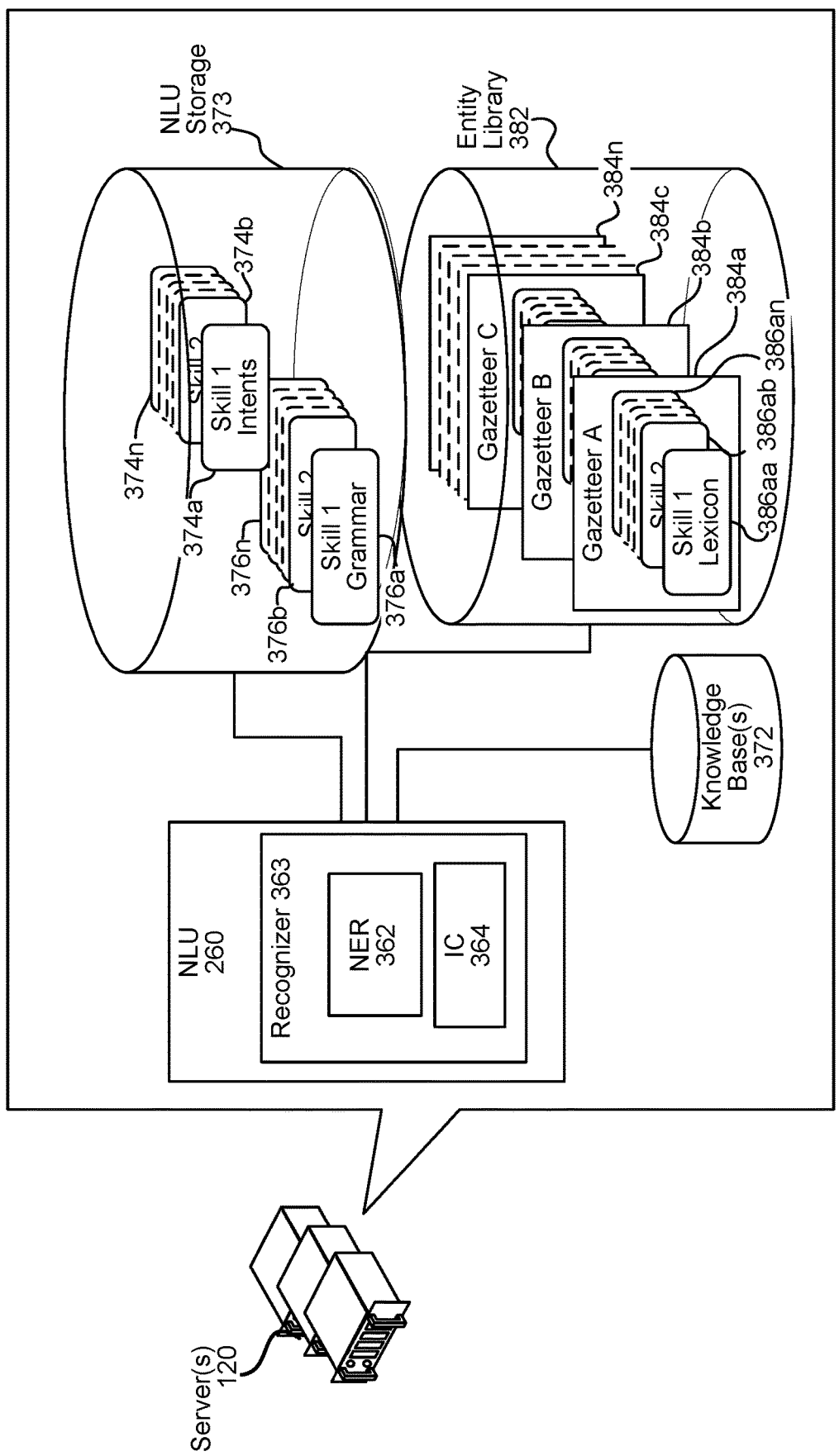
FIG. 3 is a conceptual diagram illustrating how natural language understanding processing is performed according to embodiments of the present disclosure.

FIG. 3 illustrates how NLU processing is performed on text data. Generally, the NLU component 260 attempts to make a semantic interpretation of text data input thereto. That is, the NLU component 260 determines the meaning behind text data based on the individual words and/or phrases represented therein. The NLU component 260 interprets text data to derive an intent of the user as well as pieces of the text data that allow a device (e.g., the device 110, the server(s) 120, skill server(s) 225, etc.) to complete that action.

The NLU component 260 may process text data including several ASR hypotheses. The NLU component 260 may process all (or a portion of) the ASR hypotheses input therein. Even though the ASR component 250 may output multiple ASR hypotheses, the NLU component 260 may be configured to only process with respect to the top scoring ASR hypothesis.

The NLU component 260 may include one or more recognizers 363. Each recognizer 363 may be associated with a different skill 290. Each recognizer 363 may process with respect to text data input to the NLU component 260. Each recognizer 363 may operate at least partially in parallel with other recognizers 363 of the NLU component 260.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity that may be applicable to processing performed by a skill 290. The NER component 362 (or other component of the NLU component 260) may also determine whether a word refers to an entity whose identity is not explicitly mentioned in the text data, for example "him," "her," "it" or other anaphora, exophora or the like.

Each recognizer 363, and more specifically each NER component 362, may be associated with a particular grammar model and/or database 373, a particular set of intents/actions 374, and a particular personalized lexicon 386. Each gazetteer 384 may include skill-indexed lexical information associated with a particular user and/or device 110. For example, a Gazetteer A (384a) includes skill-indexed lexical information 386aa to 386an. A user's music skill lexical information might include album titles, artist names, and song names, for example, whereas a user's contact list skill lexical information might include the names of contacts.

Since every user's music collection and contact list is presumably different, this personalized information improves entity resolution.

An NER component 362 applies grammar models 376 and lexical information 386 to determine a mention of one or more entities in text data. In this manner, the NER component 362 identifies "slots" (corresponding to one or more particular words in text data) that may be used for later processing. The NER component 362 may also label each slot with a type (e.g., noun, place, city, artist name, song name, etc.).

Each grammar model 376 includes the names of entities (i.e., nouns) commonly found in speech about the particular skill 290 to which the grammar model 376 relates, whereas the lexical information 386 is personalized to the user and/or the device 110 from which the user input originated. For example, a grammar model 376 associated with a shopping skill may include a database of words commonly used when people discuss shopping.

Each recognizer 363 may also include an intent classification (IC) component 364. An IC component 364 parses text data to determine an intent(s). An intent represents an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data to the words and phrases in an intents database 374.

The intents identifiable by a specific IC component 364 are linked to skill-specific grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (e.g., implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb, which an IC component 364 may determine corresponds to a <PlayMusic> intent. At this stage, no determination has been made as to the meaning of "mother's little helper" and "the rolling stones," but based on grammar rules and models, the NER component 362 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words (e.g., in the knowledge base 372). For example, if the text data includes "play songs by the rolling stones," after failing to determine an album name or song name called "songs" by "the rolling stones," the NER component 362 may search the database for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {skill} Music, {intent}<PlayMusic>, {artist name} rolling stones, {media type} SONG, and {song title} mother's little helper. For further example, the NER component 362 may tag "play songs by the rolling stones" as: {skill} Music, {intent}<PlayMusic>, {artist name} rolling stones, and {media type} SONG.

Figure 4:
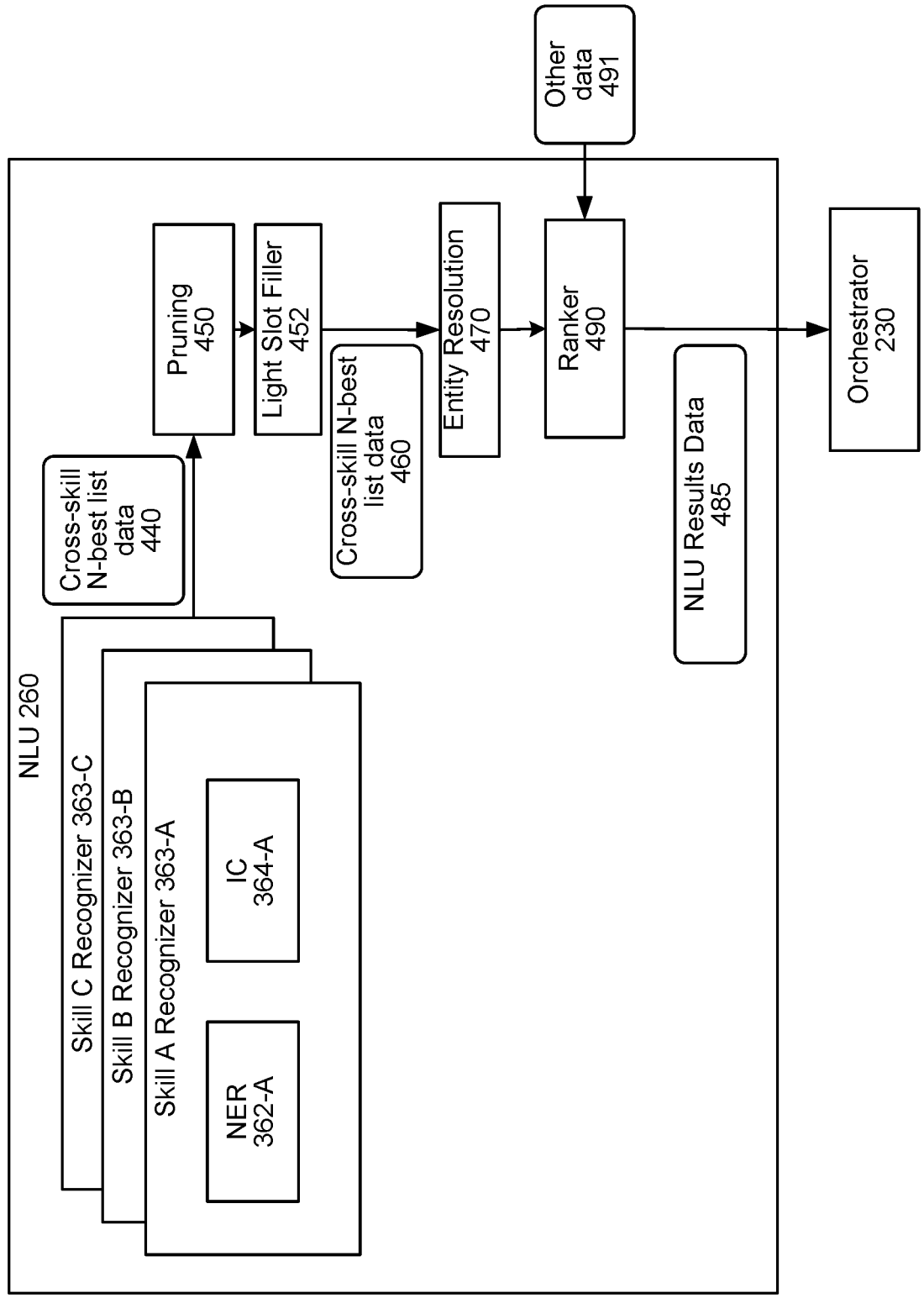
FIG. 4 is a conceptual diagram illustrating how natural language understanding processing is performed according to embodiments of the present disclosure.

The NLU component 260 may generate cross-skill N-best list data 440, which may include a list of NLU hypotheses output by each recognizer 363 (as illustrated in FIG. 4). A recognizer 363 may output tagged text data generated by an NER component 362 and an IC component 364 operated by the recognizer 363, as described above. Each NLU hypothesis including an intent indicator and text/slots may be grouped as an NLU hypothesis represented in the cross-skill N-best list data 440. Each NLU hypothesis may also be associated with one or more respective score(s) for the NLU hypothesis. For example, for an utterance of "Alexa, ask our listeners whether they prefer Katy Perry or Taylor Swift" the cross-skill N-best list data 440 may be represented as, with each line representing a separate NLU hypothesis:

[0.95] Intent: <CreatePoll> Choice 1: Katy Perry Choice 2: Taylor Swift PollType: <Preference> Potential Respondents: CurrentPodcastListeners

[0.05] Intent: <CreatePoll> Choice 1: Katy Perry Choice 2: Taylor Swift PollType: <Preference> Potential Respondents: PastPodcastListeners

[0.01] Intent: <PlayMusic> ArtistName: Taylor Swift

[0.01] Intent: <PlayMusic> ArtistName: Katy Perry

The NLU component 260 may send the cross-skill N-best list data 440 to a pruning component 450. The pruning component 450 may sort the NLU hypotheses represented in the cross-skill N-best list data 440 according to their respective scores. The pruning component 450 may then perform score thresholding with respect to the cross-skill N-best list data 440. For example, the pruning component 450 may select NLU hypotheses represented in the cross-skill N-best list data 440 associated with confidence scores satisfying (e.g., meeting and/or exceeding) a threshold confidence score. The pruning component 450 may also or alternatively perform number of NLU hypothesis thresholding. For example, the pruning component 450 may select a maximum threshold number of top scoring NLU hypotheses. The pruning component 450 may generate cross-skill N-best list data 460 including the selected NLU hypotheses. The purpose of the pruning component 450 is to create a reduced list of NLU hypotheses so that downstream, more resource intensive, processes may only operate on the NLU hypotheses that most likely represent the user's intent.

The NLU component 260 may also include a light slot filler component 452. The light slot filler component 452 can take text data from slots represented in the NLU hypotheses output by the pruning component 450 and alter it to make the text data more easily processed by downstream components. The light slot filler component 452 may perform low latency operations that do not involve heavy operations, such as those requiring reference to a knowledge base. The purpose of the light slot filler component 452 is to replace words with other words or values that may be more easily understood by downstream system components. For example, if an NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-skill N-best list data 460.

The NLU component 260 sends the cross-skill N-best list data 460 to an entity resolution component 470. The entity resolution component 470 can apply rules or other instructions to standardize labels or tokens from previous stages into an intent/slot representation. The precise transformation may depend on the skill 290. For example, for a travel skill, the entity resolution component 470 may transform text data corresponding to "Boston airport" to the standard BOS three-letter code referring to the airport. The entity resolution component 470 can refer to a knowledge base that is used to specifically identify the precise entity referred to in each slot of each NLU hypothesis represented in the cross-skill N-best list data 460. Specific intent/slot combinations may also be tied to a particular source, which may then be used to resolve the text data. In the example "play songs by the stones," the entity resolution component 470 may reference a personal music catalog, Amazon Music account, user profile data, or the like. The entity resolution component 470 may output text data including an altered N-best list that is based on the cross-skill N-best list data 460, and that includes more detailed information (e.g., entity IDs) about the specific entities mentioned in the slots and/or more detailed slot data that can eventually be used by downstream components to perform an action responsive to the user input. The NLU component 260 may include multiple entity resolution components 470 and each entity resolution component 470 may be specific to one or more skills 290.

The entity resolution component 270 may not be successful in resolving every entity and filling every slot represented in the cross-skill N-best list data 460. This may result in the entity resolution component 470 outputting incomplete results.

The NLU component 260 may include a ranker component 490. The ranker component 490 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill includes slots that are all filled/resolved, that NLU hypothesis may be assigned a higher confidence score than another NLU hypothesis including at least some slots that are unfilled/unresolved by the entity resolution component 470.

The ranker component 490 may apply re-scoring, biasing, and/or other techniques to determine the top scoring NLU hypotheses. To do so, the ranker component 490 may consider not only the data output by the entity resolution component 470, but may also consider other data 491. The other data 491 may include a variety of information. The other data 491 may include skill 490 rating or popularity data. For example, if one skill 290 has a particularly high rating, the ranker component 490 may increase the score of an NLU hypothesis associated with that skill 290, and vice versa. The other data 491 may include information about skills 290 that have been enabled for the user identifier and/or device identifier associated with the current user input. For example, the ranker component 490 may assign higher scores to NLU hypotheses associated with enabled skills 290 than NLU hypotheses associated with non-enabled skills 290. The other data 491 may include data indicating user usage history, such as if the user identifier associated with the current user input is regularly associated with user inputs that invoke a particular skill 290 or does so at particular times of day. The other data 491 may include data indicating date, time, location, weather, type of device 110, user identifier, device identifier, context, as well as other information. For example, the ranker component 490 may consider when any particular skill 290 is currently active (e.g., music being played, a game being played, etc.) with respect to the user or device 110 associated with the current user input. The other data 491 may include device type information. For example, if the device 110 does not include a display, the ranker component 490 may decrease the score associated with an NLU hypothesis that would result in displayable content being presented to a user, and vice versa.

Following ranking by the ranker component 490, the NLU component 260 may output NLU results data 485 to the orchestrator component 230. The NLU results data 485 may include the top scoring NLU hypotheses as determined by the ranker component 490. Alternatively, the NLU results data 485 may include the top scoring NLU hypothesis as determined by the ranker component 490.

The orchestrator component 230 may select a skill 290, based on the NLU results data 485, for performing an action responsive to the user input. In an example, the orchestrator component 230 may send all (or a portion of) the NLU results data 485 to a skill 290 that is represented in the NLU results data 485 and to be invoked to perform an action responsive to the user input.

Figure 5:
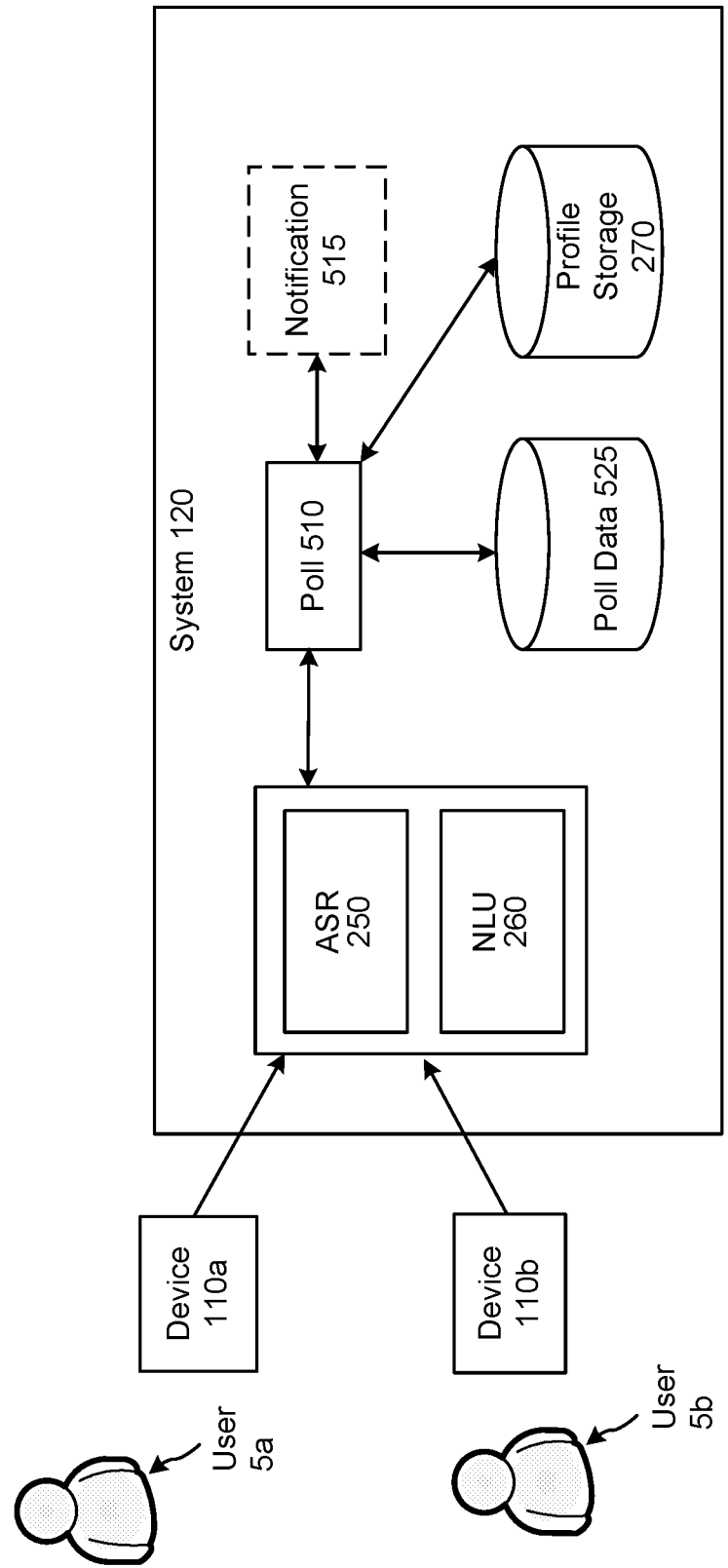
FIG. 5 conceptually illustrates a system for creating a poll and processing poll answers according to embodiments of the present disclosure.

FIG. 5 conceptually illustrates a system for creating a poll, and receiving and processing poll answers according to embodiments of the present disclosure. The system(s) 120 may include a poll component 510 configured to facilitate creation of polls. In other embodiments, the functionalities of creating a poll and sending poll data to users to answer the poll, may be performed by a skill 290/skill systems 225.

A poll requestor (user 5*a*) may speak instructions to the device 110*a* to create a poll. The user 5*a* may also speak instructions including information associated with creating the poll, such as acceptable responses, time window the poll is open/active, the number of responses required, which users to send the poll, etc. The user 5*a* may also specify, via speech, if the poll is to be published while particular content is being received. The speech processing component 240 may process the audio data received from device 110*a* using the ASR component 250, as described above, to determine text data representing the audio data. Alternatively, the input may come in as text data or other data that may be converted into text data. The NLU component 260 may process the text data, as described above, to determine an intent to create a poll. The speech processing system 240 may determine the poll question from the text data. The NLU component 260 may also determine setup information from the text data, such as acceptable responses, time window the poll is open/active, the number of responses required, which users to send the poll, etc. The system 120 may store text representing the poll question and text representing acceptable responses (if provided) as poll data. The system 120 may send the poll data and setup information related to the poll to the poll component 510 for orchestration of the poll.

The NLU component 260 may determine an intent and slot data corresponding to the poll requestor's input as described above in relation to FIGS. 3 and 4. For example, the poll requestor's input may be "Alexa ask 1000 Seattle residents if they prefer burger or pizza." The NLU component 260 may determine that the input corresponds to a <CreatePoll> intent, and a poll type slot as <Preference>. The NLU component 260 may also determine that "burger" corresponds to a first response option <PollAnswer1> slot, "pizza" corresponds to a second response option <PollAnswer2> slot, and "1000 Seattle residents" corresponds to <PollAudience> slot. As another example, the poll requestor's input may be "Alexa ask 1000 users the color of their car." The NLU component 260 may determine that the input corresponds to a <CreatePoll> intent and a poll type slot as <OpenAnswer>. The NLU component 260 may also determine that "1000 users" corresponds to <PollAudience> slot. Since the poll type is <OpenAnswer>, the response option slots may be empty. Using the slot data, the system(s) 120 may form the poll question. Using the <PollAudience> slot, the system(s) 120 may determine which users to send the poll data, and/or how many responses the poll requestor wants.

In some embodiments, the system(s) 120 may determine a relation between the entities represented in the audio data 211 or the text data 213 including instructions from a poll requestor to create a poll. An "entity" is a noun that is the grammatical subject and/or object of the relationship in the question, where the relationship may be characterized grammatically by a verb, where the semantic meaning underlying the verb may define the entity relationship. In other cases, the system(s) 120 may compare semantic meanings of the root words that define the relations, and may formulate the poll question to acquire information based on the semantic meaning of the underlying question or instructions provided by the poll requestor.

Similar relationships may be mapped to the logical form of a single relationship. So similar poll questions may be mapped to a single form. From the single logical form, a natural language question may be generated. Based on relational structures in a relational database, phrases having common and similar semantic meaning may be identified, allowing similar questions to be identified based on a commonality of semantic meaning. Meanings may be represented as nodes of a graph in the relational database, where semantic meanings that are conceptually similar will be proximate to each other, whereas semantic meanings that are conceptually different will be distant from each other, and where the distance corresponds to the number of intervening nodes in the graph between semantic meanings.

Formulaic questions may be generated based on the relationship between concepts in the relational database, but more complicated questions may be generated using the semantic framework of the single form. Among other natural-language generation (NLG) techniques, question generation may be grammar-based using a finite state machine or a context-free grammar that expands the logical form into natural language text.

A finite state machine may be encoded with language generation rules. For each logical form, it will have one or more natural language forms. Using transduction, the state machine may be used to generate natural-language questions, converting a graph of linked logical forms into natural language text. A context-free grammar may instead generate a natural language question by rewriting the logical form into a natural language sentence. A weighted-context grammar may be used, where for each relation, there may be a few different ways to express the relation. There are weights attached to each rule associated with a relation, whereby the sentence may be constrained to specific logical forms based on weight optimality. The poll component 510, or other component, may use the NLU data output by NLU component 260 to determine the question to solicit answers to the poll. Examples of NLU data include post NER data, post IC data, cross-skill N-best list data 440, cross-skill N-best list data 460, NLU results data 485, or the like.

In some embodiments, the system(s) 120 may include a semantic parser to interpret the relationship between words in a sentence, and a name entity recognition (NER) engine 362 to identify words in a sentence that correspond to place names, people names, objects, etc. The NLU process may be configured to parse text and tag the annotated text with machine-readable meanings as part of NLU processing. For example, processing the text "call mom," "call" may be tagged as a command (to execute a phone call) and "mom" may be tagged as a specific entity and object of the command (and the telephone number for the entity corresponding to "mom" stored in a contact list may be included in the annotated result).

The semantic parser may parse a poll question to identify words as subject, object, verb, preposition, etc., based on grammar rules and models, prior to the name entity recognition (NER) engine 362 processing the text to recognize named entities. This process may include semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like. Based on sentence structure and keywords, rules and heuristics executed by the NLU component 260 may identify a sentence as forming a question.

In another example, processing of the text "do you like burgers or pizzas," "burgers" and "pizzas" may be tagged as food items and may be stored as the response options for the poll in the poll data storage 525. The system(s) 120 may also determine semantically similar words to the response options and store them in the poll data storage 525. For example, the system(s) 120 may determine that "hamburgers" and "cheese burgers" are semantically similar to "burgers" and store "hamburgers" and "cheese burgers" as another way of the poll answerer to choose the response option "burgers." Similarly, the system(s) 120 may determine that "burger" is the singular form of "burgers" and store "burger" as another way of the poll answerer to choose the response option "burgers."

In some embodiments, the system(s) 120 may determine a topic corresponding to the poll. The system(s) 120 may process the poll question, entities, entity relationships, sematic meaning of the words, objects, subjects, verbs, etc. corresponding to the poll question to determine a topic. The system(s) 120 may use semantic parsing and/or NLU techniques to determine a topic. For example, in processing the text "do you like burgers or pizzas?" the system(s) 120 may determine that the poll question relates to the topic "food" based on the objects "burgers" and "pizzas" being food items. In processing the text "do you like Ariana Grande or Taylor Swift?" the system(s) 120 may determine that the poll question relates to the topics "celebrities," "music," and/or "pop culture" based on identifying the entity names "Ariana Grande" and "Taylor Swift" and/or identifying a relationship between those entities. The system(s) 120 may employ one or more machine learning models to determine the topic related to the poll question. The machine learning model(s) may determine a confidence score corresponding to each topic determined as relating to the poll question, and the topic with the best confidence score may be stored as the poll topic in the poll data storage 525.

The poll component 510, along with other components of the system, may be configured to determine a question corresponding to the poll, where the question may correspond to the poll itself, namely the question intended to prompt a user to respond to the poll. For example, the poll component 510, for example using a natural language generation (NLG) component, may use the information from the poll request (such as text data corresponding to the poll request and/or NLU data corresponding to the poll request) to construct a question designed to solicit answers for the poll. For example, the NLU component 260 may process text data corresponding to the poll request to determine an intent to create a poll (for example by performing intent classification) as well as to determine potential answers to the poll (for example by parsing the poll request text data) as well as to determine a potential group to direct the poll to (such as current listeners of a podcast, residence of a particular locale, etc.). The NLU component 260 may create NLU data indicating all or some of the above and may pass that information to the poll component 510. The poll component 510 may receive the NLU data and may use NLG techniques to determine text corresponding to the poll question. The poll component 510 may also use the text data of the original poll request to assist in determining the question text.

The poll component 510 (or other component) may then use information about the group of potential respondents as well as user profile information from profile storage 270 (or other information) to identify one or more user profiles that indicate the corresponding user belongs in the group of potential respondents (e.g., lives in a specific locale, is currently consuming interactive content related to the poll such as a podcast or the like) and has indicated permission to receive the poll. One or more recipient devices can be determined from the user profile(s) and those device(s) may be send the poll question for response.

The poll question may be sent in text or other form allowing a user to respond in text, by pressing a button, by voice, or in some other fashion. The text of the poll question may also be converted to audio data representing speech using TTS. The audio data may then be sent to a user device to receive the answer. If user permission has been granted, the user device may be instructed to allow the microphones to capture the answer to the poll question without the respondent necessarily saying a wakeword. This may allow a user who is consuming certain content (e.g., a podcast), and who has requested this feature be activated, to be asked a poll and to naturally answer the poll without interruption that may be caused having to say a wakeword.

The poll component 510 may also be configured to receive and process poll answers from users. For example, an answering user (user 5b) may speak his answer to the poll to device 110b when prompted by the device 110b. The poll component 510 and/or the system 120 may cause the device 110b to output audio data representing a poll question, and after outputting the poll question, the poll component 510/ the system 120 may cause the device 110b to activate or open its microphone to capture speech from the user 5b. The user 5b may speak his or her answer to the poll, the device 110b may capture audio data representing the user's 5b answer and send the audio data to the system 120 for processing. The ASR component 250 may process the audio data, as described above, to determine text data representing the user's 5b answer to the poll. In some embodiments, the user's 5b input may be in text form or other data that may be converted into text data. The user's 5b input may be associated with the poll ID identifying the poll the user answered. In one embodiment, the system 120 may send the text data representing the user's 5b answer to the poll component 510 for further processing. In other embodiments, the NLU component 260 may process the text data to determine an intent and/or slot data corresponding to the user's 5b answer to the poll.

In cases where response options are associated with the poll, the NLU component 260 may determine whether the user input corresponds to one of the response options. The NLU component 260 may determine a semantic meaning of the user input, recognize an entity, and/or identify a relationship corresponding to the user input, and determine if the user input corresponds to a response option. For example, if the output audio corresponding to the poll question is "Do you like burgers or pizzas?" and the user input is "I like hamburgers" or "hamburgers," the NLU component 260 may determine the slot data as "hamburgers" and determine that the semantic meaning of "hamburgers" corresponds to the response option "burgers."

In open-ended answers, for example where the output audio corresponding to the poll question is "What is the color of your car?" and the user input is "I drive a black car" or "black," the NLU component 260 may determine that the answer should correspond to a color and the slot data representing color is "black." The system(s) 120 may store text data representing "black" as the answer provided by the user for the poll.

In an example embodiment, the poll component 510 may be configured to handle all requests associated with users and polls. Further components of the poll component 510 are described in relation to FIG. 6.

In an example embodiment, the system may include a notification component 515 that may be configured to coordinate and manage delivery or sending of messages to subscribing endpoints or user devices. The notification component 515 enables a publisher, for example a poll requestor, to communicate with subscribers by producing and sending messages and/or notifications to a topic, which may be a logical access point and communication channel. Subscribers, for example users who may interested in answering polls, receive the message and/or notification if they are subscribed to the topic. In other embodiments, the poll component 510 may be configured to perform these functionalities.

In an example embodiment, the system(s) 120 may be configured to broadcast or send content to a user's device 110.

The content being received may include interactive portions during which one or more polls can be outputted. The poll component 510 may generate output audio data representing the poll question, and send the output audio data to the system 120 with an instruction to play the output audio data during the interactive portion of the content. The poll component 510 may also send an instruction to the system 120 to open or activate the microphone associated with the device 110 after playing the output audio data to enable the device 110 to capture the user's response to the poll question.

The system may store poll data in poll data storage 525. The poll data storage 525 may facilitate storage of poll information and distribution of event triggers corresponding to polls. The poll data storage 525 may store a poll identifier/ID that identifies a poll, data representing the poll requestor (e.g., a user profile ID), time when the poll was created, an answer count representing the number of received answers, an answer format (e.g., open-ended answer, multiple choices, etc.), an answer tally, and the like.

The system may store user data in user profile storage 270. The user profile storage 270 may facilitate storage of user data and status information relating to a poll. The user profile storage 270 may store a user identifier/ID that identifies a user profile, one or more poll IDs identifying polls the user may have subscribe to or answered, data identifying poll triggers seen by the user, answer(s) provided by the user, and the like.

The poll component 510 may determine that the incoming request for a poll is associated with a profile of the entity requesting the poll. The entity may be a user or may be company (e.g., podcaster, etc.). The poll component 510 may make the poll answers available to the poll requestor, for example by associating the result data with the profile of the poll creator, sending an indication to a device associated with the poll creator's profile noting the availability of the answer data, etc.

In some embodiments, the poll component 510 may be configured to process and compile the answers to the poll, and generate a report for the poll requestor. In some cases, the poll data includes two or more response options, and the users answering the poll choose one of the response options as their answer. The poll component 510 may process the text data representing the users' answers to determine which response option the user chose, and keep track/count of how many users chose a response option.

In other cases, the poll may accept open-ended or free-form answers. The poll component 510 may process the text data representing the answering users' input to determine one or more themes corresponding to the answers, or the poll component 510 may process the answers to categorize them. The poll component 510 may employ one or more machine learning models configured to process user answers and predict one or more themes corresponding to the user answers. The machine learning model(s) may output one or more themes with corresponding theme scores indicating a likelihood of the theme being associated with the answers. As an example, for present purposes a theme may include a correlation among the answers, a relationship between certain answers and certain respondents (e.g., users answering at a particular time tend to a certain answer, users from a particular location tend to a certain answer, etc.), a trend among the answers (e.g., most respondents are selecting a certain answer), or other data related to how answers may relate to each other.

Once the poll has ended (based on the time window, number of responses collected or instruction from the poll requestor), the poll component 510 may generate a report summarizing the users' answers to the poll, and send the report to a device (e.g., 110a) associated with the poll requestor.

Figure 6:
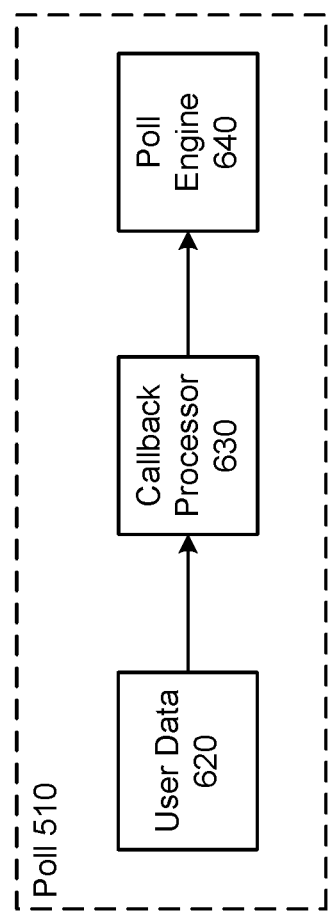
FIG. 6 conceptually illustrates a system for sending poll data to user devices according to embodiments of the present disclosure.

FIG. 6 conceptually illustrates components of a poll component for sending poll data to user devices according to embodiments of the present disclosure. The poll component 510 may include components to facilitate sending polls to users such as, for example, user data component 620 and callback processor 630. These components may facilitate sending polls to user during live broadcast of content (e.g., podcasts, show, etc.). These components may coordinate sending polls to multiple users (that may be listening/viewing the live content) at substantially the same time and may coordinate receiving answers from multiple users, where the answer may need to be received within a short time period so that the live content may continue broadcasting. The live content may be paused by the content producer so that the poll can be outputted and answers can be received by the system.

The poll component 510 may be configured to orchestrate a poll and process requests from the poll requestor such as creating the poll, provisioning broadcast of the poll, selecting users to publish the poll, distributing trigger events to user profiles, and the like. The user data component 620 may be configured to process requests to the poll component 510, such as sending poll questions, receiving answers, sending other messages, and the like. The user data component 620 may store data (e.g., in profile storage 270) corresponding to a user in the scope of an active poll.

The user data component 620 and the callback processor 630 may be configured to support synchronous requests from multiple users. In other embodiments, the poll component 510 may be configured to process requests from users in an asynchronous manner. The poll component 510 may also include a poll engine 640 that that stores and manages an application programming interface (API) for providing functionalities relating to creating and sending polls. In some embodiments, the API may process data relating to the polls and answers to the polls, for example, slot data for poll type, poll audience, response options, user answers, and the like. The API may process data to determine an answer tally for polls with response options or a theme tally for open-ended answer polls.

After the poll data is generated and stored, the poll data is published to the notification component 515 to forward the poll data to subscribing user profiles. The notification component 515 forwards the poll data to each user profile for output at a device 110 associated with the user profile.

In an example embodiment, the poll component 510 determines which users the poll is published to based on the poll requestor's specifications. During creation, the poll requestor may specify that the poll is answered by users within a particular geographic area, within a specified time window, and/or during broadcast of certain content. These specifications may be stored in the poll data table 525. Prior to sending an event trigger to the poll skill 550, the poll component 510 may determine whether the event trigger should be sent to the user based on a location associated with the user profile. If the location associated with the user profile is not within the geographic area associated with the poll data retrieved from the poll data table 525, then the poll component 510 may send a message to the poll skill 550 to not send a trigger to the user profile for the particular poll. If the location associated with the user profile is within the geographic area associated with the poll data, then the poll component 510 may send a trigger to the poll skill 550 for the particular poll.

In a similar manner, the poll component 510 may check if a time window associated with the poll data retrieved from the poll data table 525 is still open. For example, the poll requestor may specify that the poll has to be answered within a particular time period from creation (e.g., a day, a week, etc.) or that the poll is open during a certain time period (e.g., a day after creation for 2 days, June 1 to June 4, the month of July, etc.). Prior to sending an event trigger to the poll skill 550, the poll component 510 may determine if the poll is active based on the time window associated with the poll data. If the time when the event trigger is to be sent is within the time window associated with the poll data, then the poll component 510 may send a trigger to the poll skill 550 for the particular poll. If the time when the event trigger is to be sent is not within the time window, then the poll component 510 may send a message to the poll skill 550 to not send a trigger for the particular poll.

In some embodiments, the poll requestor may want to output the poll to a user while the user is receiving specified content (live or pre-recorded; video and/or audio content). In one example, the poll requestor may want the system to output the poll while the user is receiving a particular type of content, such as a podcast, radio, television show, videos, or other type of content. In another example, the poll requestor may want to output the poll while the user is receiving a particular content item, such as a particular podcast episode, a particular radio station, a particular television show/episode, a particular video, and the like. The poll component 510 may determine if the user is receiving the specified content prior to sending a trigger to the poll skill 550 to output the poll. The poll component 510 may retrieve data from the system 120 indicating what content the device 110 and/or the user profile associated with the user is receiving.

In other embodiments, the poll may be available to access upon a user's request. For example, a user may say "Alexa, do I have any polls to answer?" and the system 120 may invoke the poll skill 550 to determine a poll that the user can answer.

In some embodiments, the poll may remain open/active until a certain number of responses have been received. For example, the poll requestor may specify the number of responses he or she wants to the poll (e.g., "Alexa, poll 1000 users . . . "). The poll component 510 may determine how many responses to the poll have been received by retrieving data indicating the number of responses received from the poll data table 525. Prior to sending an event trigger to the poll skill 550, the poll component 510 may check if more responses are needed based on a comparison of the number of responses received and the number of responses required as indicated by the associated poll data.

The poll requestor may provide these specifications or poll setup information using voice instructions, and the system 120 may process the instructions using ASR and NLU to determine the setup information associated with the poll.

Figure 7:
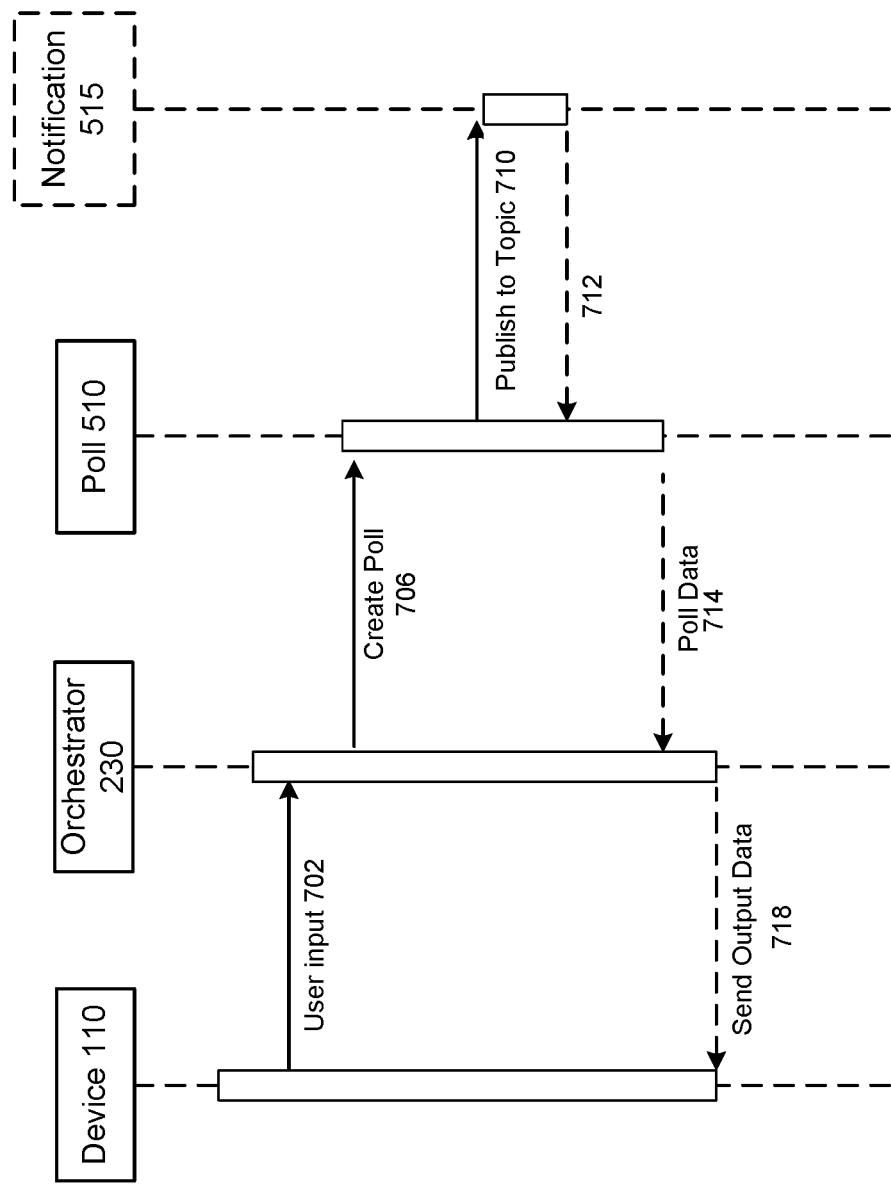
FIG. 7 conceptually illustrates a system for creating a poll according to embodiments of the present disclosure.

In an example embodiment, for a poll requestor to send polls to users the system 100 employs an event trigger distribution system described in FIGS. 7-12. FIG. 7 conceptually illustrates a system for creating a poll according to embodiments of the present disclosure. A user who wants to create a poll provides user input 702 to the device 110. The user input 702 may be audio data representing spoken instructions to create a poll. In other cases, the user input 702 may be text data representing instructions to create a poll. The device 110 sends the user input 702 to the orchestrator 230 for processing. The user input 702 may be processed using speech processing as described above to determine text data and an intent to create a poll. (Note for ease of illustration speech processing operations are not shown in FIGS. 7-12.) The orchestrator 230 may determine to invoke the poll component 510 based on the NLU processing results corresponding to the user input 702. The orchestrator 230 may send an instruction and related data 706 to the poll component 510 to create a poll. In some embodiments, the poll component 510 may send an instruction 710 to the notification component 515 to create and publish a topic corresponding to the poll, thus making a poll topic available for subscription. In some embodiments, the notification component 515 may be used to push polls, during broadcast of live content, to multiple users at the same time (or substantially the same time).

The notification component 515 may send a return message 712 to the poll component 510 indicating completion of the task. The poll component 510 may send a return message 714 to the orchestrator 230 including the poll question that was created along with other optional data associated with the poll. The orchestrator 230 may send a return message 718 to the device 110 including output data (audio data or other non-audio data) indicating to the poll requesting user that the poll was created, the poll question and/or other optional data corresponding to the poll.

Figure 8:
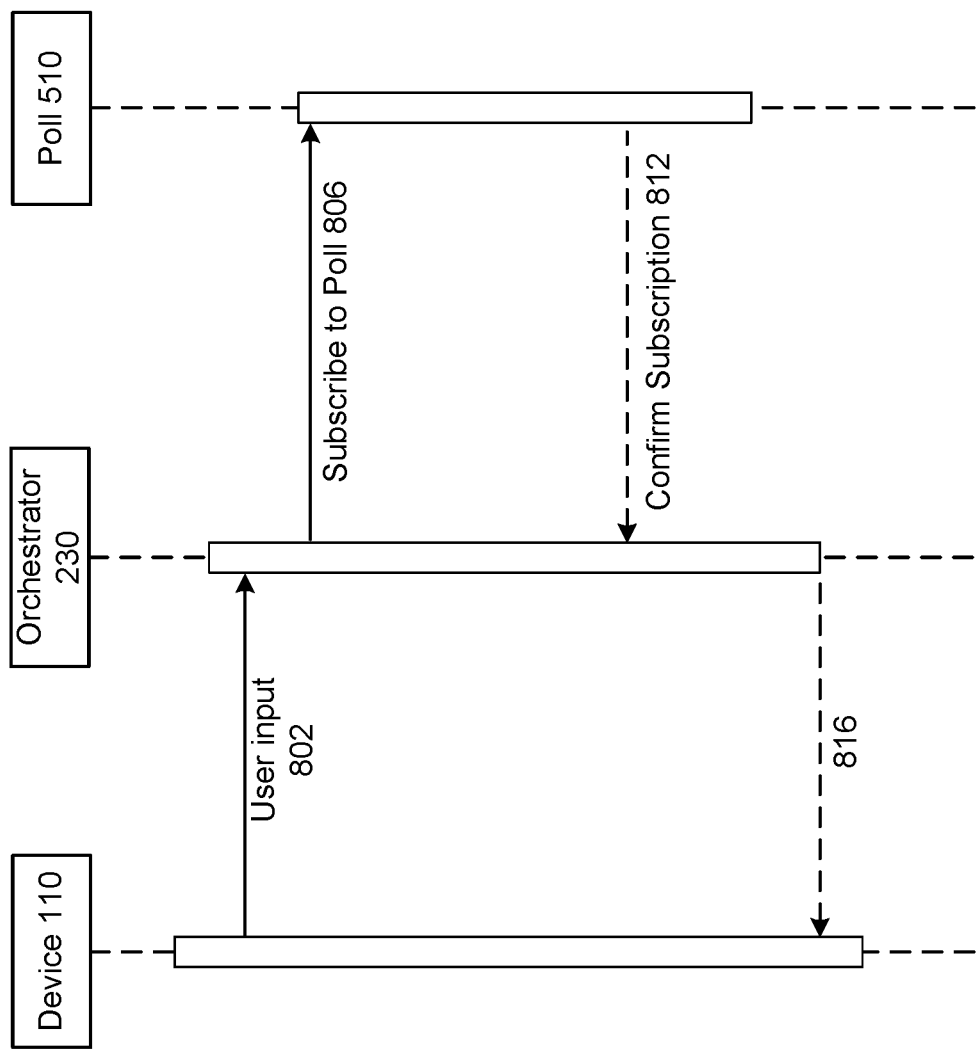
FIG. 8 conceptually illustrates a system for enabling a user to subscribe to answer polls according to embodiments of the present disclosure.

FIG. 8 conceptually illustrates a system for enabling a user to subscribe to answer polls according to embodiments of the present disclosure. A user who wants to subscribe to answer polls may provide user input 802 to the device 110. The user input 802 may be audio data representing spoken instructions to subscribe to one or more polls or to subscribe to answer polls. In other embodiments, the user input 802 may be text data or other form of input data representing instructions to subscribe to one or more polls or to subscribe to answer polls. The user may indicate a specific poll he or she wants to subscribe to or the user may indicate a type of poll (e.g., open answers, response options), polls relating to a particular topic (e.g., food, cars, TV shows, etc.), and the like. The device 110 may send the user input 802 to the orchestrator 230 to invoke the poll component 510. The user input 802 may be processed using speech processing as described above to determine text data and an intent to subscribe to a poll. The orchestrator 230 may determine to invoke the poll component 510 based on the NLU processing results corresponding to the user input 802. The orchestrator 230 may send an instruction and related data 806 to the poll component 510 to subscribe the user to answer one or more polls. The poll component 510 may determine which poll(s) or types of polls the user wants to subscribe to. The request 806 may include a user profile id corresponding to the user requesting to subscribe to answer polls. The poll component 510 may send messages and/or notifications to the user profile id when a poll is available for the user to answer.

The poll component 510 may send a return message 812 to the orchestrator 230 and the orchestrator 230 may send a return message 816 to the device 110 confirming subscription of the user to answer polls.

Figure 9:
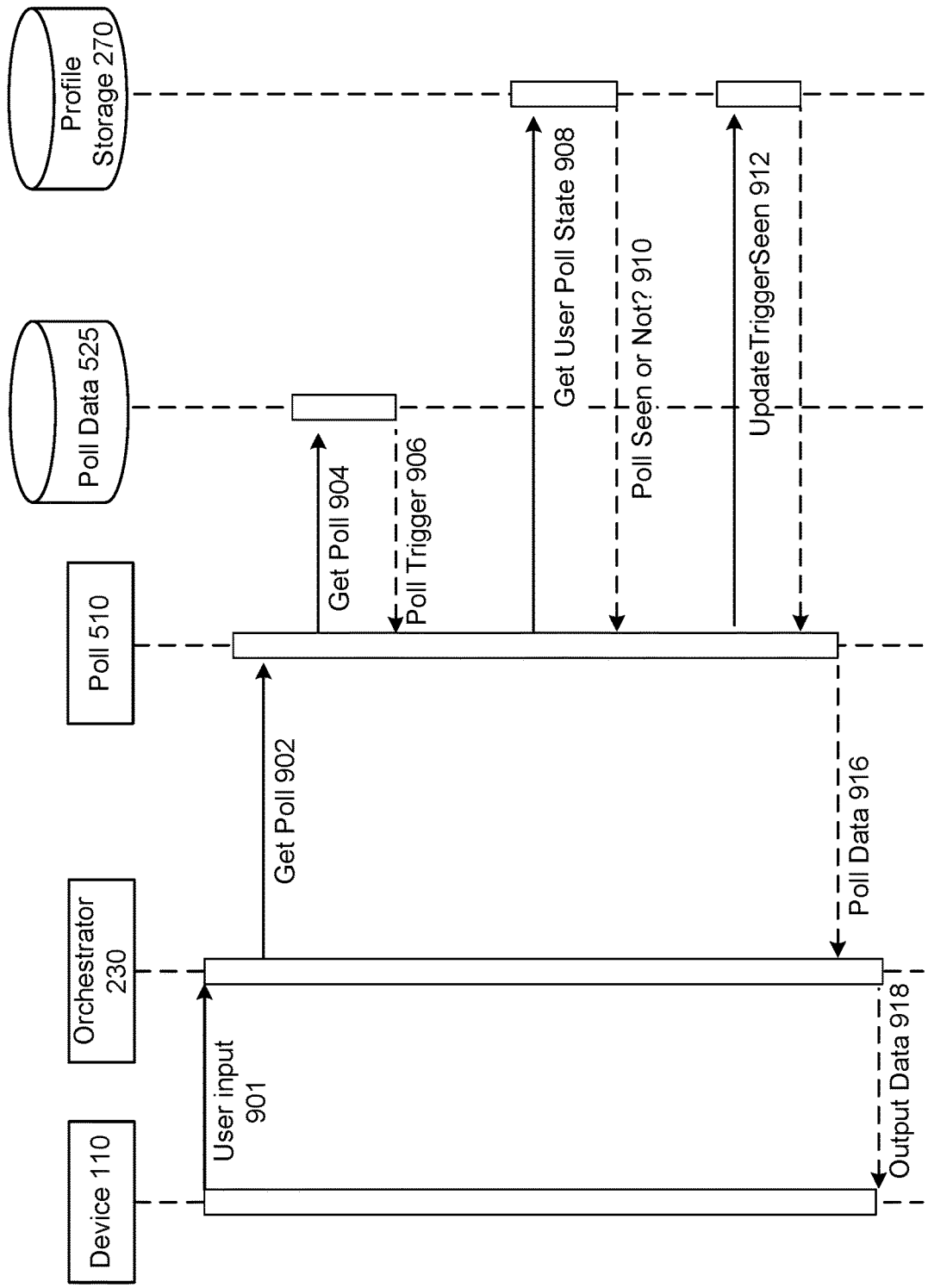
FIG. 9 conceptually illustrates a system for sending a poll to a user when requested by the user according to embodiments of the present disclosure.

FIG. 9 conceptually illustrates a system for sending a poll to a user when requested by an answering user according to embodiments of the present disclosure. A user who wants to answer a poll may provide user input 901 to the device 110. The user input 901 may be audio data representing spoken instructions to provide one or more polls to the user to answer. In other embodiments, the user input 901 may be text data or other form of input data representing instructions to provide polls to the user to answer. For example, the user input 901 may be "Alexa, are there any polls available?" The orchestrator 230 may send a request 902 to the poll component 510 to get poll data. The poll component 510 may send a request 904 to the poll data storage 525 for poll data. The poll data storage 525 may send a poll trigger 906 to the poll component 510. The poll component 510 may send a request 908 to the user profile storage 270 to get status information corresponding to the poll with respect to the user wanting to answer the poll. The user profile storage 270 may send data 910 indicating that whether the poll corresponding to the trigger has been seen or acknowledged or has not been seen or acknowledged by that the user profile id corresponding to the user requesting the poll. The data 910 may be based on the data stored in the user profile storage 270 indicating a status of the user with respect to whether the user has already answered the poll. If the poll has not been answered by the user, then the poll component 510 may send the poll data 916 to the orchestrator 230. The orchestrator 230 may send output data 918 (audio data or non-audio data) to the device 110 to output the poll question to the user. In this case, the poll component 510 may send data 912 to the user profile storage 270 to update poll triggers seen or acknowledged by user profiles. The user profile storage 270 may send a return message 914 to the poll component 510 indicating completion of the task.

Figure 10:
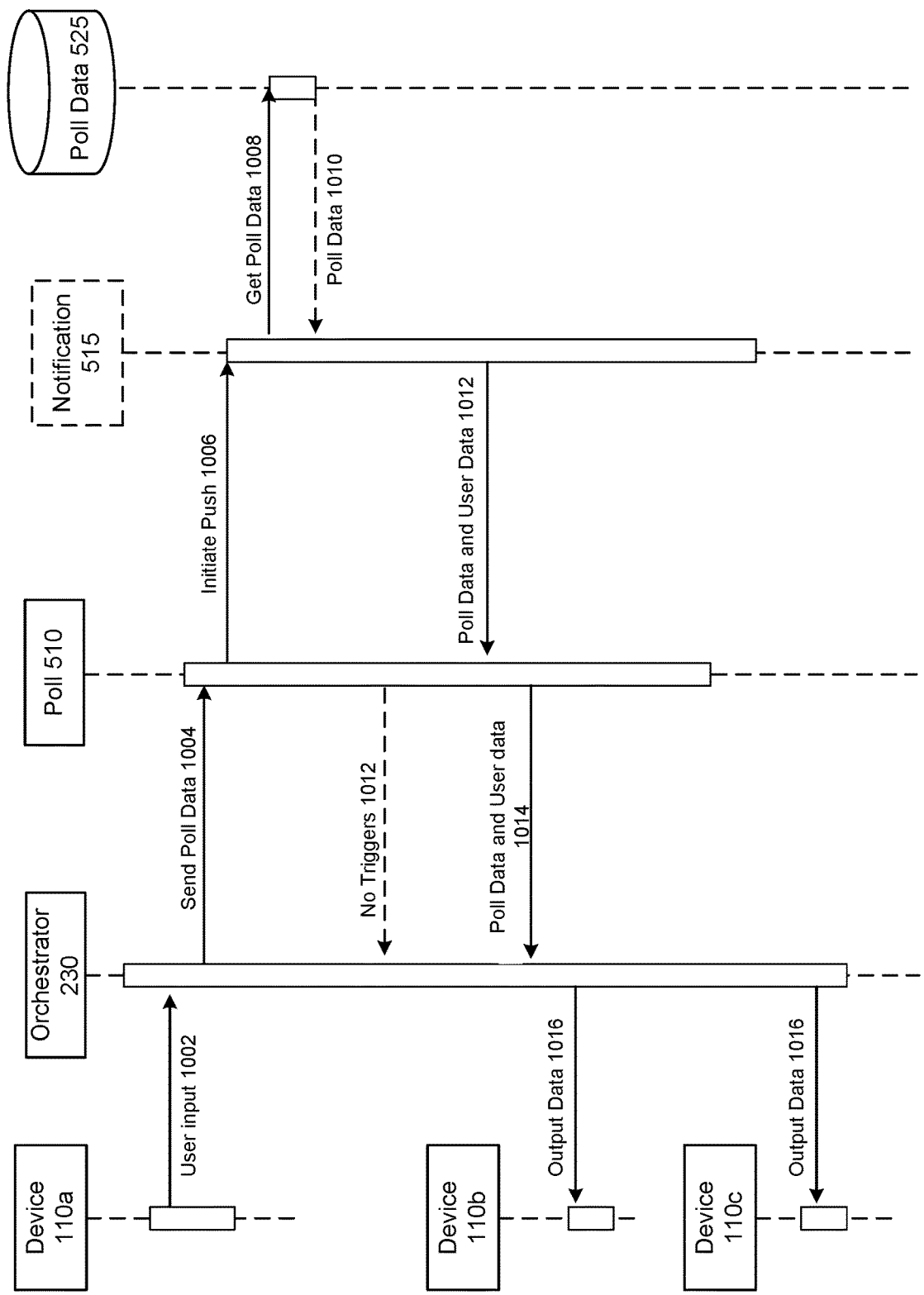
FIG. 10 conceptually illustrates a system for sending a poll question to answering users when requested by a poll requestor according to embodiments of the present disclosure.

FIG. 10 conceptually illustrates a system for sending a poll question to answering users when requested by the poll requesting user according to the embodiment of the present disclosure. A user who wants to push or send a poll to multiple users at the same time, for example during broadcast of live content, may provide user input 1002 to the device 110a. The user input 1002 may be audio data representing spoken instructions to send or push a poll to answering users. In other embodiments, the user input 1002 may be text data or other form of input data representing instructions to send or push a poll to answering users. For example, the user input 1002 may be "Alexa, let's do a poll of the audience?" The orchestrator 230 may determine, using speech processing on the user input 1002, the poll requestor's intent to send a poll to users to answer, and may send instruction 1004 to the poll component 510 to send poll data. The instruction 1004 may include a user profile id corresponding to the user that provided the user input 1002. The poll component 515 may determine, using the user profile id, which poll data is to be pushed to the users. In some embodiments, the poll requestor may have provided instructions to the system to create a poll as described in connection with FIG. 7. In other embodiments, the poll requestor may presently provide instructions (along with user input 1002) to the system to create a poll, and the system may create the poll as described in connection with FIG. 7 storing poll data in poll data storage 525 and publishing to a topic at the notification component 515.

The poll component 515 may send an instruction to the notification component 515 to initiate push of poll data to multiple users/devices/user profile ids. As described above, the notification component 515 may coordinate sending poll data to multiple users at the same time. The notification component 515 may send a request 1008 to the poll data storage 525 to get poll data, and the poll data storage 525 may send the poll data 1010. The poll data may include question text data and/or response options text data. The notification component 515 may send the poll data and user data 1012 to the poll component 510. The user data may indicate which users/user profile ids/device ids are to receive the poll data. In some embodiments, the notification component 515 may determine which users receive the poll data based on which users are viewing/accessing the broadcast content. For example, the device or user profile id viewing/accessing certain broadcast content may subscribe to the notification component 515 to receive poll data during broadcast. The poll component 510 may send the poll data and the user data 1014 to the orchestrator 230. The orchestrator 230 may generate output data 1016 (audio data or non-audio data) using the poll data, the question text data and/or the response option text data. The orchestrator 230 may send the output data 1016 to multiple devices 110b, 110c for output to users who can then provide answers to the poll.

Accordingly, FIG. 10 illustrates the case where the poll requestor instructs the system to output a poll to multiple users at the same time, for example during a live broadcast. FIG. 9 illustrates the case where a user (answering user) asks the system to provide a poll he or she can answer.

Figure 11:
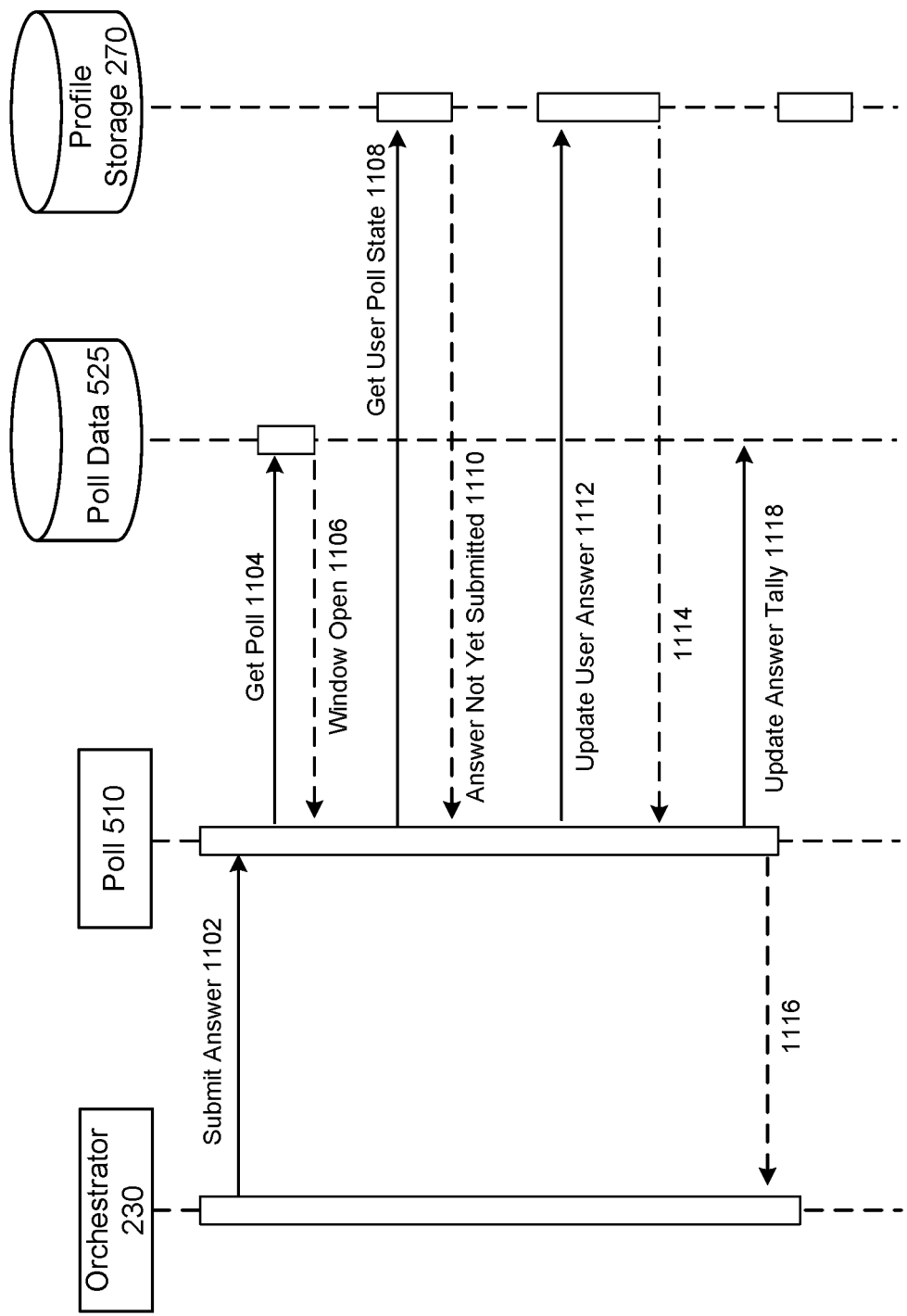
FIG. 11 conceptually illustrates a system for receiving an answer from a user according to embodiments of the present disclosure.

FIG. 11 conceptually illustrates a system for receiving an answer from a user according to embodiments of the present disclosure. The orchestrator 230 may send data 1102 representing an answer from the user to the poll component 510. The poll component 510 may send a request 1104 to the poll data storage 525 to get poll data to determine if the poll is active to receive answers. The poll question/data sent to the user may be associated with a poll identifier/ID, and the answer(s) provided by the answering users may be associated with the poll ID. The poll data storage 525 may send data 1106 to the poll component 510 indicating that the time window for the poll is open. The poll component 510 may send a request 1108 to the user profile storage 270 to get poll status information with respect to the user who provided the answer 1102. The user profile storage 270 may send data 1110 to the poll component 510 indicating that the user has not answered the poll. The poll component 510 may send a message 1112 to the user profile storage 270 to update the table to indicate the user profile id corresponding to the user has answered the question. The user profile storage 270 may send a return message 1114 to the poll component 510. The poll component 510 may send a return message 1116 to the orchestrator 230. The poll component 510 may send answer data 1118 to the poll data storage 525 to update the answers corresponding to the poll. FIG. 11 illustrates some requests and responses performed by the system, however, there may be additional requests, responses and/or actions (e.g., storage of data) that may be performed by the system to aggregate the answers to the poll.

Figure 12:
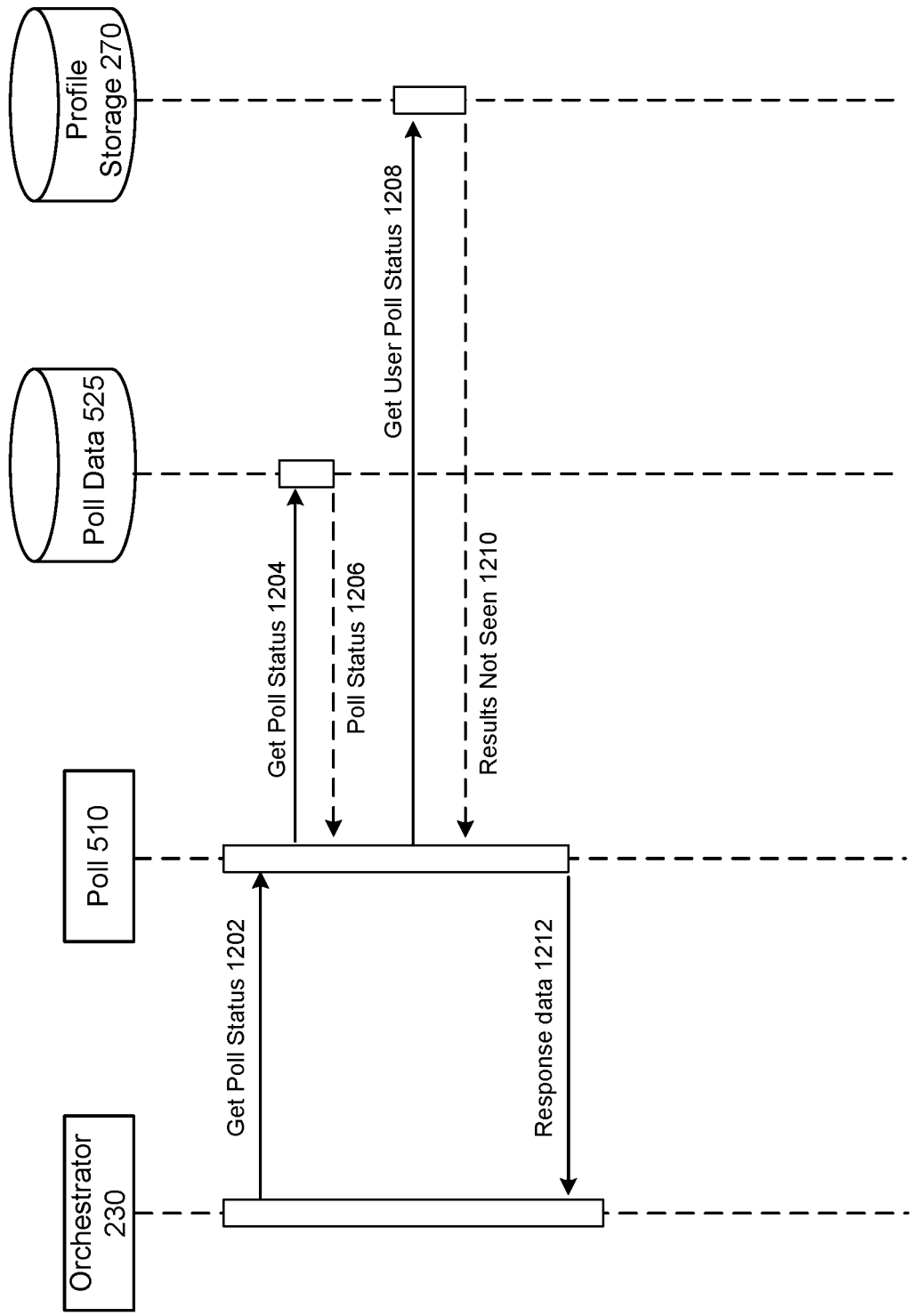
FIG. 12 conceptually illustrates a system for providing poll results to an answering user according to embodiments of the present disclosure.

FIG. 12 conceptually illustrates a system for making poll results available according to embodiments of the present disclosure. The orchestrator 230 may send a request 1202 to the poll component 510 to get poll status information, which may indicate whether the poll has ended or is still open. The poll component 510 may send a request 1204 to the poll data storage 525 to get poll status information. The poll data storage 525 may send poll status data 1206 to the poll component 510. The poll status data 1206 may indicate that the poll has ended/is closed. The poll component 510, in response, may send a request to the user profile storage 270 to determine if a particular user has seen the answer results for the poll. The user profile storage 270 may send data 1210 to the poll component 510 indicating that the user has not seen the poll results. The poll component 510 may send response data 1212 to the orchestrator 230. The orchestrator 230 may send output data (not shown) to a device 110, where the output data may include the response data representing the answers to the poll. For example, the system in some embodiments may provide a user the results of the poll (n number of people chose response 1, m number of people chose response 2, etc.). The system may make the poll results available to a user in response to the user requesting the system for it (not shown). In other embodiments, the system may push the poll results to the user, in accordance with user permissions and settings, once the poll has ended. Poll results may be made available upon request by associating the poll results with a profile, for example of the poll requestor. Poll results may also be made available by delivering information (such as the poll results themselves, a link pointing the poll results, a summary of the poll results, or the like) to a profile, device or inbox, for example of the poll requestor. Poll results may also be made available by providing the answer of the poll to the user why responded to the poll. For example, if the poll includes a trivia question, after a responding user submits his/her answer, the correct answer may be provided to the responding user. Poll results may be made available as text, charts, computer readable data structure(s), as audio (such as text that has been processed using TTS) or other forms.

Machine learning, as discussed here in, refers to a computing technique that allows systems to learn ways to solve complex problems without needing an explicit algorithm for the system to follow. ML may use a trained model that consists of internally configured operations that can manipulate a particular type of input data to determine a desired result. Trained models can be used in many computing tasks such as computer vision, speech processing, predictive analyses, and many more.

Trained models may take a variety of forms including trained classifiers, support vector machines (SVMs), neural networks (such as deep neural networks (DNNs), recurrent neural networks (RNNs), or convolutional neural networks (CNNs) and others. As an example, a neural network can include an input layer, an output layer and one or more intermediate hidden layers where the input layer is configured to take in a certain kind of data and the output layer is configured to output the desired kind of data to result from the network and the hidden layer(s) perform a variety of functions to generate output data from the input data.

Various techniques may be used to train machine learning models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Figure 13:
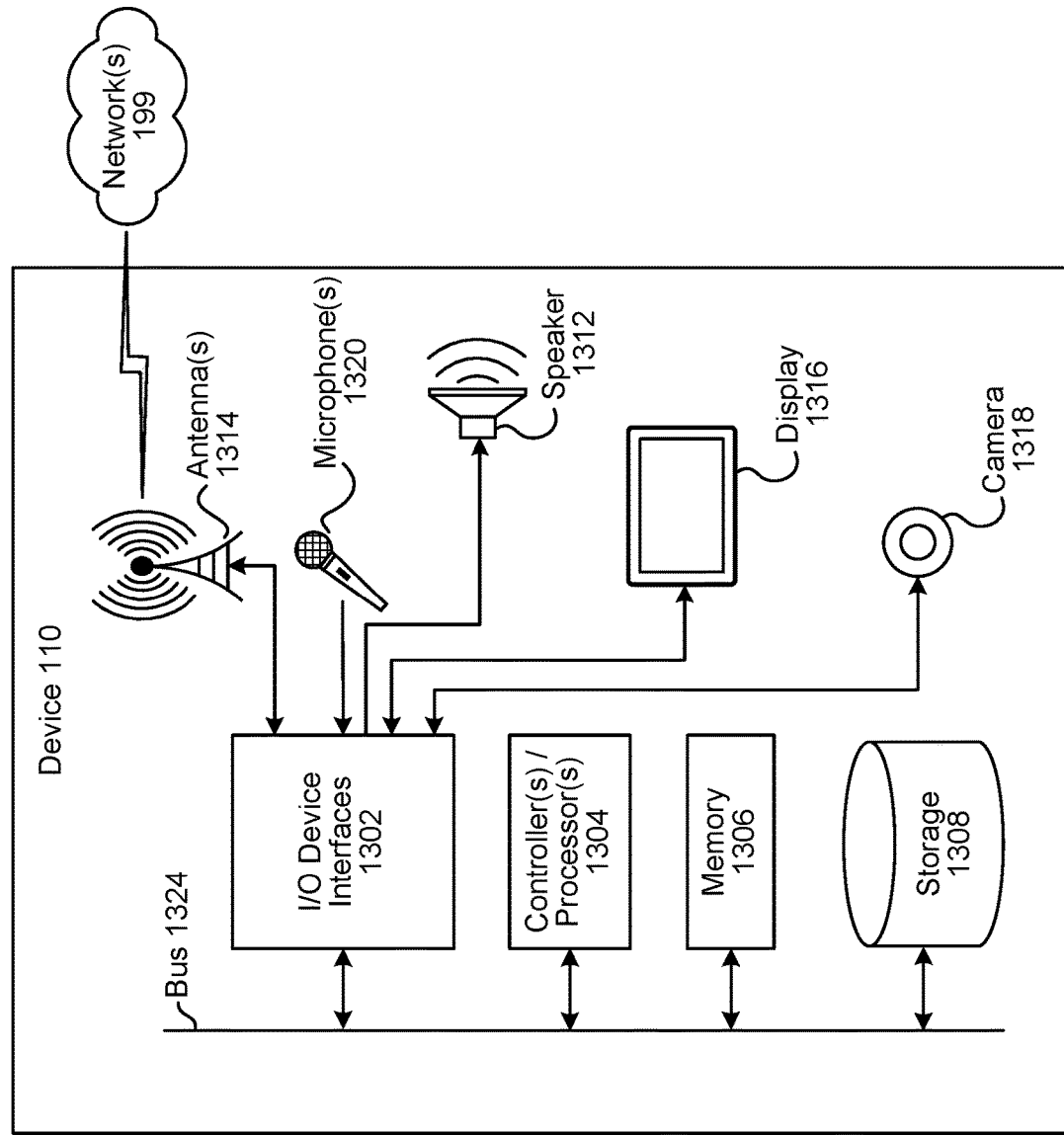
FIG. 13 is a block diagram conceptually illustrating example components of a device according to embodiments of the present disclosure.
Figure 14:
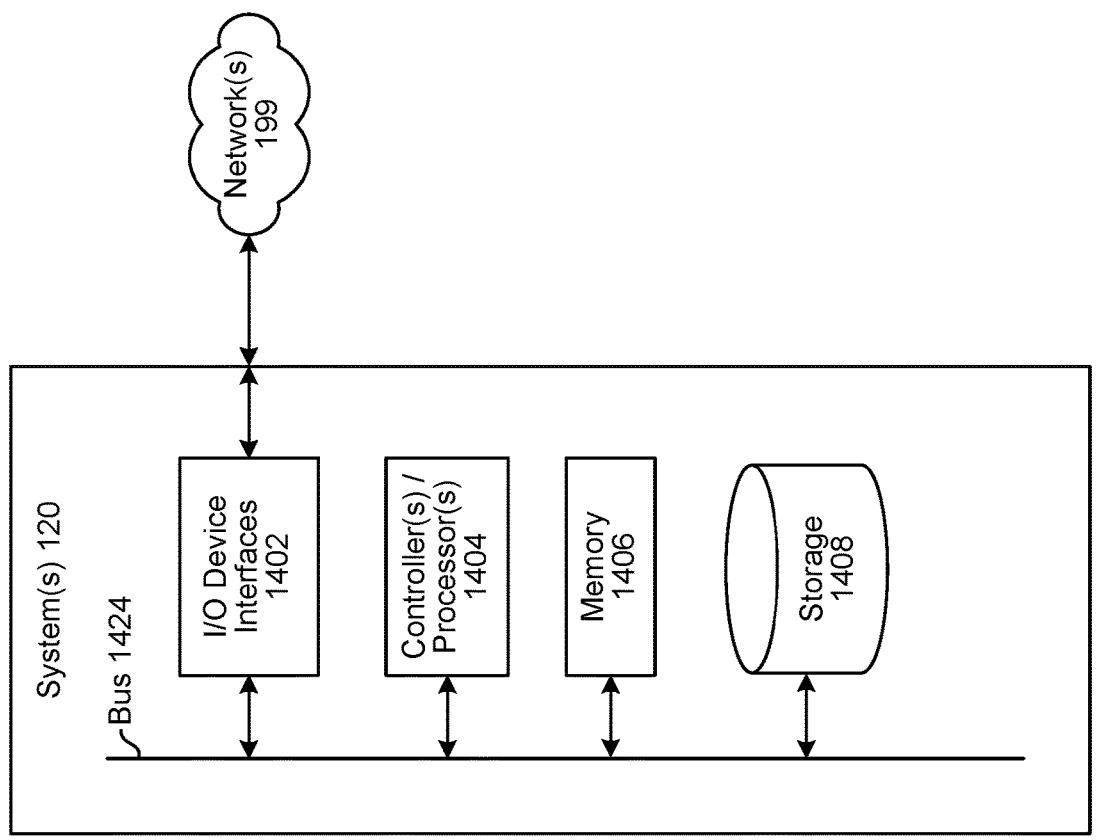
FIG. 14 is a block diagram conceptually illustrating example components of a server according to embodiments of the present disclosure.

FIG. 13 is a block diagram conceptually illustrating a device 110 that may be used with the system. FIG. 14 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1104/1204), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/225) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1302/1402).

Computer instructions for operating each device (110/120/225) and its various components may be executed by the respective device's controller(s)/processor(s) (1304/1404), using the memory (1106/1206) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/225) includes input/output device interfaces (1302/1402). A variety of components may be connected through the input/output device interfaces (1302/1402), as will be discussed further below. Additionally, each device (110/120/225) may include an address/data bus (1324/1424) for conveying data among components of the respective device. Each component within a device (110/120/225) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones 1320, a wired headset or a wireless headset (not illustrated), etc. If an array of microphones 1320 is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1314, the I/O device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interfaces (1302/1402) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1302/1402), processor(s) (1304/1404), memory (1306/1406), and/or storage (1308/1408) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 15:
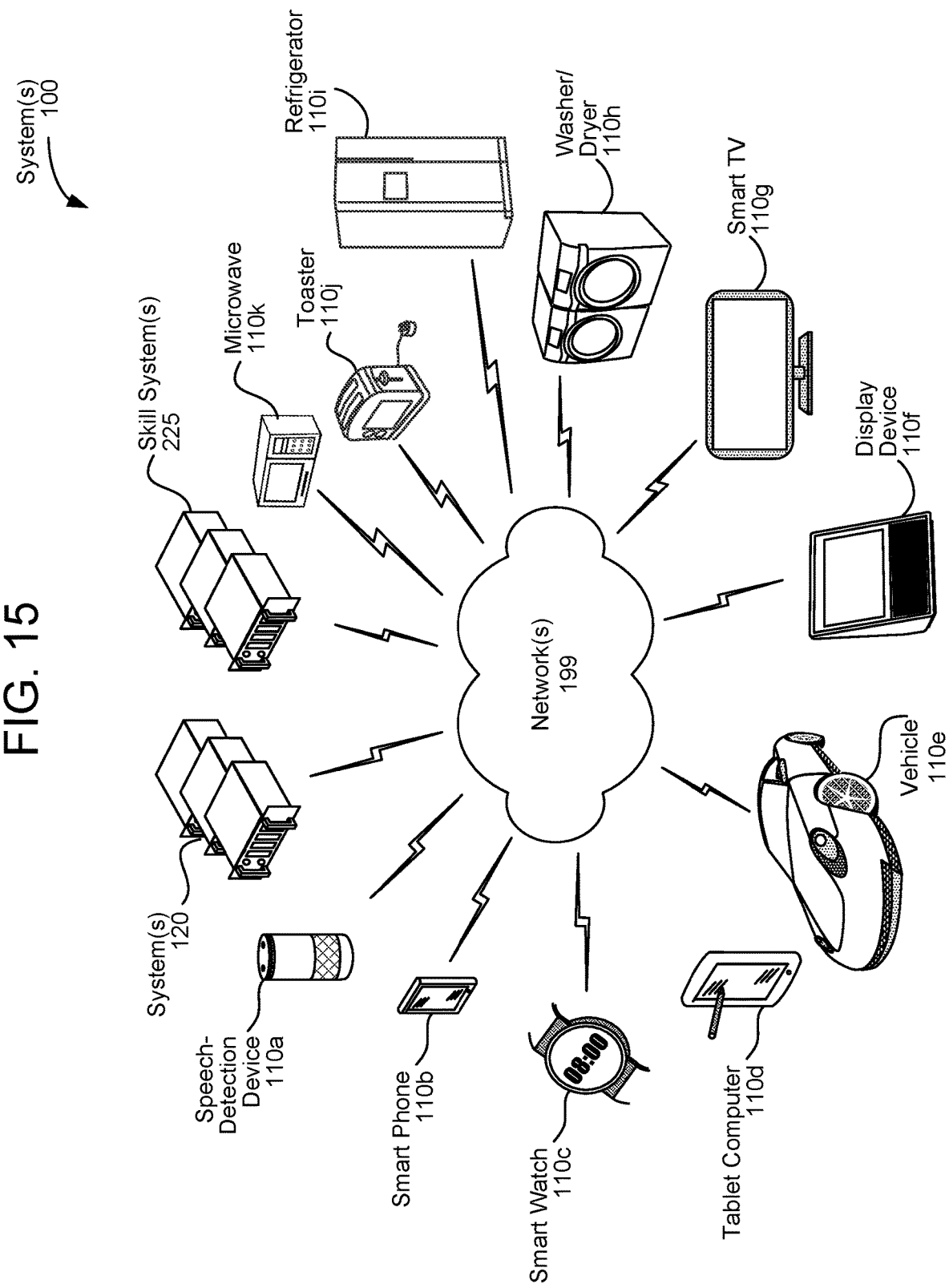
FIG. 15 illustrates an example of a computer network for use with the speech processing system.

As illustrated in FIG. 15, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, and/or a microwave 110k may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first audio data from a first device;
   processing the first audio data using automatic speech recognition (ASR) to determine first text data;
   processing the first text data using natural language understanding (NLU) to determine NLU data comprising:
      an intent to create a poll,
      that a first portion of the first text data corresponds to a first potential answer to the poll,
      that a second portion of the first text data corresponds to a second potential answer to the poll, and
      that a third portion of the first text data corresponds to a group of potential respondents of the poll;
   processing at least a portion of the NLU data using natural language generation to determine question text corresponding to a question requesting selection of at least one of the first potential answer or the second potential answer; and
   associating the question text data with a poll identifier.

2. The computer-implemented method of claim 1, further comprising:
   determining a user profile corresponding to the group of potential respondents;
   determining the user profile includes data corresponding to permission to receive a poll;
   determining a second device associated with the user profile;
   performing text-to-speech (TTS) processing on the question text data to generate output audio data;
   sending the output audio data to the second device;
   receiving, from the second device, second audio data;
   processing the second audio data using ASR to determine second text data;
   determining that the second text data is associated with the poll identifier;
   determining that the second text data represents the first potential answer;
   based at least in part on the second text data representing the first potential answer, generating poll response data; and
   making the poll response data available to the first device.

3. The computer-implemented method of claim 2, further comprising:
   determining that the group of potential respondents corresponds to devices receiving interactive content;
   determining that the second device is receiving the interactive content;
   sending an instruction to the second device to activate a microphone associated with the second device after the output audio data is outputted by the second device; and
   receiving the second audio data from the second device.

4. The computer-implemented method of claim 1, further comprising:
   determine a geographic area corresponding to the group of potential respondents;
   associating the geographic area with the poll identifier;
   determining a user profile includes data corresponding to permission to receive a poll;
   determining a second device associated with the user profile, the second device within the geographic area; and
   sending, to the second device, output data corresponding to the poll.

5. A computer-implemented method comprising:
   receiving first audio data associated with a first profile;
   processing the first audio data to determine:
      an intent to create a poll,
      a first potential answer to the poll, and
      a second potential answer to the poll;
   determining a question requesting selection of at least one of the first potential answer or the second potential answer;
   associating the question with a poll identifier;
   determining a user profile to send the question;
   sending output audio data corresponding to the question to a user device associated with the user profile;
   receiving second audio data from the user device;
   processing the second audio data to determine response data;
   associating the response data with the poll identifier; and
   making the response data available to the first profile.

6. The computer-implemented method of claim 5, further comprising:
   processing the first audio data to determine question text data;
   processing the first audio data to determine a time window for receiving responses to the poll;
   associating the question text data and the time window with the poll identifier;
   determining the user device is active during the time window; and
   generating the output audio data using text-to-speech (TTS) and the question text data.

7. The computer-implemented method of claim 5, wherein:
   determining the user profile to send the question comprises:
      determining the first profile is associated with media content, and
      determining the user device associated with the user profile is receiving the media content, wherein the media content includes a portion to be output at a first time;
   sending the output audio data corresponding to the question to the user device associated with the user profile comprises:
      sending a first command to the user device to output the output audio data after the first time; and
   the method further comprises:
      sending a second command to the user device to activate a microphone associated with the user device to enable the user device to receive the second audio data after the output audio data is output by the user device.

8. The computer-implemented method of claim 5, further comprising:
processing the first audio data to determine a geographic area corresponding to the poll,
associating the geographic area with the poll identifier; and
wherein determining the user profile to send the question comprises:
determining a location associated with the user profile, and
sending the output audio data to the user device in response to the location being within the geographic area.

9. The computer-implemented method of claim 5, further comprising:
sending data corresponding to the question to a third device;
receiving an indication from the third device that a user action was performed using the third device, the user action corresponding to a first response to the poll;
processing the second audio data to determine a second response to the poll; and
associating the first response and the second response with the poll identifier.

10. The computer-implemented method of claim 5, further comprising:
generating second output audio data requesting setup information for the poll;
sending the second output audio data to a device associated with the first profile for playback;
receiving third audio data from the device in response to the second output audio data;
processing the third audio data to determine a time window and a geographic area corresponding to the poll; and
associating the time window and the geographic area with the poll identifier.

11. The computer-implemented method of claim 5, further comprising:
determining a second user profile to send the question;
determining a second user device associated with the second user profile is outputting content;
identifying a third user device associated with the second user profile; and
sending, to the third user device, data corresponding to the question.

12. The computer-implemented method of claim 5, wherein processing the first audio data to determine the intent to create the poll comprises:
processing the first audio data using automatic speech recognition (ASR) to determine first text data, and
processing the first text data using natural language understanding (NLU) to determine NLU data corresponding to the intent to create the poll, the first potential answer, and the second potential answer; and
wherein determining the question comprises:
determining question text data using at least a portion of the NLU data; and
associating the question text data with the poll identifier.

13. A system comprising:
at least one processor; and
at least one memory including instructions that, when executed by the at least one processor, cause the system to:
receive first audio data associated with a first profile;
process the first audio data to determine:
an intent to create a poll,
a first potential answer to the poll, and
a second potential answer to the poll;
determine a question requesting selection of at least one of the first potential answer or the second potential answer;
associate the question with a poll identifier;
determine a user profile to send the question;
send output audio data corresponding to the question to a user device associated with the user profile;
receive second audio data from the user device;
process the second audio data to determine response data;
associate the response data with the poll identifier; and
making the response data available to the first profile.

14. The system of claim 13, wherein the instructions, when executed by the at least one processor, further cause the system to:
process the first audio data to determine question text data;
process the first audio data to determine a time window for receiving responses to the poll;
associate the question text data and the time window with the poll identifier;
determine the user device is active during the time window; and
generate the output audio data using text-to-speech (TTS) and the question text data.

15. The system of claim 13, wherein:
the instructions to determine the user profile to send the question, when executed by the at least one processor, further cause the system to:
determine the first profile is associated with media content, and
determine the user device associated with the user profile is receiving the media content, wherein the media content includes a portion to be output at a first time;
the instructions to send the output audio data corresponding to the question to the user device associated with the user profile when executed by the at least one processor, further cause the system to:
send a first command to the user device to output the output audio data after the first time; and
the instructions, when executed by the at least one processor, further cause the system to send a second command to the user device to activate a microphone associated with the user device to enable the user device to receive the second audio data after the output audio data is output by the user device.

16. The system of claim 13, wherein the instructions, when executed by the at least one processor, further cause the system to:
process the first audio data to determine a geographic area corresponding to the poll, and
associate the geographic area with the poll identifier; and
wherein the instructions to determine the user profile to send the question when executed by the at least one processor, further cause the system to:
determine a location associated with the user profile, and
send the output audio data to the user device in response to the location being within the geographic area.

17. The system of claim 13, wherein the instructions, when executed by the at least one processor, further cause the system to:

send data corresponding to the question to a third device;
receive an indication from the third device that a user action was performed using the third device, the user action corresponding to a first response to the poll;
process the second audio data to determine a second response to the poll; and
associate the first response and the second response with the poll identifier.

18. The system of claim 13, wherein the instructions, when executed by the at least one processor, further cause the system to:
generate second output audio data requesting setup information for the poll;
send the second output audio data to a device associated with the first profile for playback;
receive third audio data from the user device in response to the second output audio data;
process the third audio data to determine a time window and a geographic area corresponding to the poll; and
associate the time window and the geographic area with the poll identifier.

19. The system of claim 13, wherein the instructions, when executed by the at least one processor, further cause the system to:
determine a second user profile to send the question;
determine a second user device associated with the second user profile is outputting content;
identify a third user device associated with the second user profile; and
send, to the third user device, data corresponding to the question.

20. The system of claim 13, wherein the instructions to process the first audio data to determine the intent to create the poll, when executed by the at least one processor, further cause the system to:
process the first audio data using automatic speech recognition (ASR) to determine first text data; and
process the first text data using natural language understanding (NLU) to determine the NLU data corresponding to the intent to create the poll, the first potential answer, and the second potential answer; and
wherein the instructions to determine the question when executed by the at least one processor, further cause the system to:
determine question text data using at least a portion of the NLU data; and
associate the question text data with the poll identifier.

* * * * *